US011968282B2

(12) United States Patent
Sambandan et al.

(10) Patent No.: US 11,968,282 B2
(45) Date of Patent: Apr. 23, 2024

(54) ADAPTER FOR CONVERTING BETWEEN THE NETWORK CONFIGURATION PROTOCOL (NETCONF) AND THE TECHNICAL REPORT 069 (TR-069) PROTOCOL

(71) Applicant: CommScope Technologies LLC, Hickory, NC (US)

(72) Inventors: Devaraj Sambandan, Bengaluru (IN); Shanthakumar Ramakrishnan, Westford, MA (US); Ravi Setti, Visakhapatnam (IN); Sharath Chandra Chikka Kempegowda, RajaRajeshwari Nagar (IN)

(73) Assignee: CommScope Technologies LLC, Claremont, NC (US)

( * ) Notice: Subject to any disclaimer, the term of this patent is extended or adjusted under 35 U.S.C. 154(b) by 346 days.

(21) Appl. No.: 17/207,037

(22) Filed: Mar. 19, 2021

(65) Prior Publication Data

US 2021/0297508 A1 Sep. 23, 2021

Related U.S. Application Data

(60) Provisional application No. 63/018,641, filed on May 1, 2020.

(30) Foreign Application Priority Data

Mar. 20, 2020 (IN) .............................. 202031012143

(51) Int. Cl.
*H04L 69/08* (2022.01)
*H04L 69/18* (2022.01)
(Continued)

(52) U.S. Cl.
CPC .............. *H04L 69/08* (2013.01); *H04L 69/18* (2013.01); *H04W 24/04* (2013.01); *H04W 80/00* (2013.01)

(58) Field of Classification Search
CPC ......... H04L 69/08; H04L 69/18; H04L 67/34; H04L 41/0803; H04L 41/12; H04L 41/40; H04W 24/04; H04W 80/00; H04W 24/02
See application file for complete search history.

(56) References Cited

U.S. PATENT DOCUMENTS 8,000,345 B2   8/2011   Blackford et al.
2003/0154401 A1*  8/2003  Hartman ................. H04L 63/20
                                               726/30
(Continued)

OTHER PUBLICATIONS

De C. Silva et al., Management Platforms and Protocols for Internet of Things: A Survey, Sensors, Feb. 2019, pp. 1 through 41, 19(3), MDPI, www.mdpi.com/journal/sensors.
(Continued)

*Primary Examiner* — Kiet Tang
(74) *Attorney, Agent, or Firm* — Fogg & Powers LLC

(57) ABSTRACT

One embodiment is directed to an adapter entity comprising a Technical Report 069 (TR-069) protocol automatic configuration server (ACS) module configured to communicate with managed equipment included in a radio access network (RAN) using the TR-069 protocol. The adapter entity further comprises a Network Configuration Protocol (NETCONF) server configured to communicate with an Open Network Automation Platform (ONAP) Software Defined Network Radio instance (SDN-R) of an ONAP management and orchestration (MANO) environment using NETCONF. The adapter entity further comprises a TR-069-to-NETCONF mapper module, communicatively coupled to the TR-069 protocol ACS module and the NETCONF server, configured to dynamically map NETCONF requests and responses to
(Continued)

and from TR-069 Protocol requests and responses. The adapter entity is configured to dynamically map NETCONF requests and responses to and from TR-069 Protocol requests and responses. Other embodiments and examples are disclosed.

33 Claims, 10 Drawing Sheets

(51) Int. Cl.
*H04W 24/04* (2009.01)
*H04W 80/00* (2009.01)

(56) References Cited

U.S. PATENT DOCUMENTS

| | | | |
|---|---|---|---|
| 2009/0150526 A1* | 6/2009 | Wu | H04L 41/0803 709/223 |
| 2010/0332639 A1* | 12/2010 | Diaz | H04L 41/12 709/223 |
| 2012/0100861 A1* | 4/2012 | Zhang | H04W 24/00 455/444 |
| 2015/0312089 A1 | 10/2015 | Yang et al. | |
| 2015/0358399 A1* | 12/2015 | Baugher | H04L 41/40 709/203 |
| 2015/0365501 A1* | 12/2015 | Uyehara | H04L 25/03305 455/561 |
| 2017/0295103 A1 | 10/2017 | Starsinic et al. | |
| 2019/0245740 A1 | 8/2019 | Kachhla | |
| 2020/0186446 A1* | 6/2020 | Yousaf | H04L 41/042 |

OTHER PUBLICATIONS

International Searching Authority, "International Search Report and Written Opinion from PCT Application No. PCT/US2021/023213", from Foreign Counterpart to U.S. Appl. No. 17/207,037, filed Jul. 14, 2021, pp. 1 through 13, Published: WO.

Klaus et al., "TR-069 DPE WAN Management Protocol", CWMP Version 1.4, Mar. 2018, pp. 1 through 277, Issue: 1 Amendment 6, Broadband Forum.

Begwani et al., "Open Network Automation Platform (ONAP) Architecture Overview", The Linux Foundation, Apr. 13, 2017, pp. 1 through 9, ONAP (Open Network Automation Platform).

Broadband Forum, "TR-069 CPE WAN Management Protocol", Technical Report, Mar. 2018, pp. 1 through 276, Issue: 1 Amendment 6, CWMP Version: 1.4, The Broadband Forum.

Enns et al., "Network Configuration Protocol (NETCONF)", Internet Engineering Task Force (IETF), Jun. 2011, pp. 1 through 113.

Enns, "NETCONG Configuration Protocol", Network Working Group, Dec. 2006, pp. 1 through 95, Juniper Networks.

Hands-Onap, "Experience VNF onboarding, ONAP hackathon", Oct. 19, 2017, pp. 1 through 20, HANDS-ONAP.

European Patent Office, "Partial Supplementary European Search Report", dated Feb. 1, 2024, from EP Application No. 21770544.1, from Foreign Counterpart to U.S. Appl. No. 17/207,037, Page(s) 1 through 18, Published: EP.

Secretary of SA WG2, "Report of SA WG2 meetings #69", 3GPP TSG SA WG2 Meeting#69, Nov. 17-21, 2008, Miami, Florida, USA, pp. 1 through 206.

* cited by examiner

ADAPTER FOR CONVERTING BETWEEN THE NETWORK CONFIGURATION PROTOCOL (NETCONF) AND THE TECHNICAL REPORT 069 (TR-069) PROTOCOL

CROSS-REFERENCE TO RELATED APPLICATIONS

This application claims priority to Indian provisional patent application No. 202031012143, filed Mar. 20, 2020, which is hereby incorporated herein by reference in its entirety.

This application claims the benefit of U.S. Provisional Patent Application Ser. No. 63/018,641, filed on May 1, 2020, which is hereby incorporated herein by reference in its entirety.

BACKGROUND

Technical Report 069 (TR-069) is a technical specification promulgated by the Broadband Forum that defines a protocol for managing networking equipment. This protocol is also referred to here as the "TR-069 Protocol." Some of the Third Generation (3G) and Fourth Generation (4G) specifications promulgated by the Third Generation Partnership Project (3GPP) specify the use of the TR-069 Protocol for managing equipment implementing a base station. As a result, vendors of 3G and 4G base station equipment have traditionally implemented the TR-069 Protocol in their 3G and 4G base station equipment for interacting with network management systems.

Increasingly, wireless operators are using management and orchestration (MANO) environments such as the Open Network Automation Platform (ONAP) for managing network equipment. These MANO environments typically use the Network Configuration Protocol (NETCONF). NETCONF is another protocol for managing networking equipment. NETCONF was promulgated by the Internet Engineering Task Force (IETF). However, as noted above, 3G and 4G base station equipment typically implements the TR-069 Protocol, not NETCONF, and therefore typically does not natively work with such MANO environments.

SUMMARY

One embodiment is directed to an adapter entity configured to manage managed equipment included in a radio access network (RAN) comprising a plurality of nodes, at least some of which are communicatively coupled to each other via a fronthaul network. The RAN is configured to wirelessly communicate with user equipment (UE). The adapter entity comprises a Technical Report 069 (TR-069) protocol automatic configuration server (ACS) module configured to communicate with at least one node of the RAN using the TR-069 protocol, a Network Configuration Protocol (NETCONF) server configured to communicate with a management entity using NETCONF, and a TR-069-to-NETCONF mapper module that is communicatively coupled to the TR-069 protocol ACS module and the NETCONF server. The TR-069-to-NETCONF mapper module is configured to dynamically map NETCONF requests and responses to and from TR-069 Protocol requests and responses. The NETCONF requests and responses are related to the managed equipment and are communicated between the NETCONF server and the management entity. The TR-069 Protocol requests and responses are related to the managed equipment and are communicated between the TR-069 protocol ACS module and the managed equipment.

Another embodiment is directed to a method of managing managed equipment used to implement a radio access network (RAN) that is configured to wirelessly communicate with user equipment (UE). The method comprises receiving, at an adapter entity, a TR-069 INFORM remote procedure call (RPC) sent from the managed equipment that specifies a particular event associated with the managed equipment has occurred and determining which, if any, TR-069 RPCs need to be issued to the managed equipment in response to the received TR-069 INFORM RPC. The method further comprises determining which, if any, messages need to be sent to one or more management entities in response to the received TR-069 INFORM RPC, issuing to the managed equipment any TR-069 RPCs that need to be issued in response to the received TR-069 INFORM RPC, receiving respective responses to the TR-069 RPCs, and sending any necessary messages to be sent to one or more management entities in response to the received TR-069 INFORM RPC.

Another embodiment is directed to a method of managing managed equipment used to implement a radio access network (RAN) that is configured to wirelessly communicate with user equipment (UE). The method comprises receiving, at an adapter entity, one more a Network Configuration Protocol (NETCONF) remote procedure calls (RPCs) sent from a management entity using NETCONF, the received NETCONF RPCs specifying one or more NETCONF operations to performed for the managed equipment. The method further comprises determining, by the adapter entity, one or more TR-069 RPCs to issue to the managed equipment in order to carry out the one or more NETCONF operations specified in the one or more received NETCONF RPCs, issuing the determined one or more TR-069 RPCs from the adapter entity to the managed equipment in order to carry out the one or more NETCONF operations specified in the one or more received NETCONF RPCs, receiving, at the adapter entity, respective responses to the TR-069 RPCs, assembling, by the adapter entity, a response to the one or more received NETCONF RPCs using the responses to the TR-069 RPCs, and sending the response to the received NETCONF RPCs from the adapter entity to the management entity.

Other embodiments are disclosed.

The details of various embodiments are set forth in the accompanying drawings and the description below. Other features and advantages will become apparent from the description, the drawings, and the claims.

DRAWINGS

Figure 2:
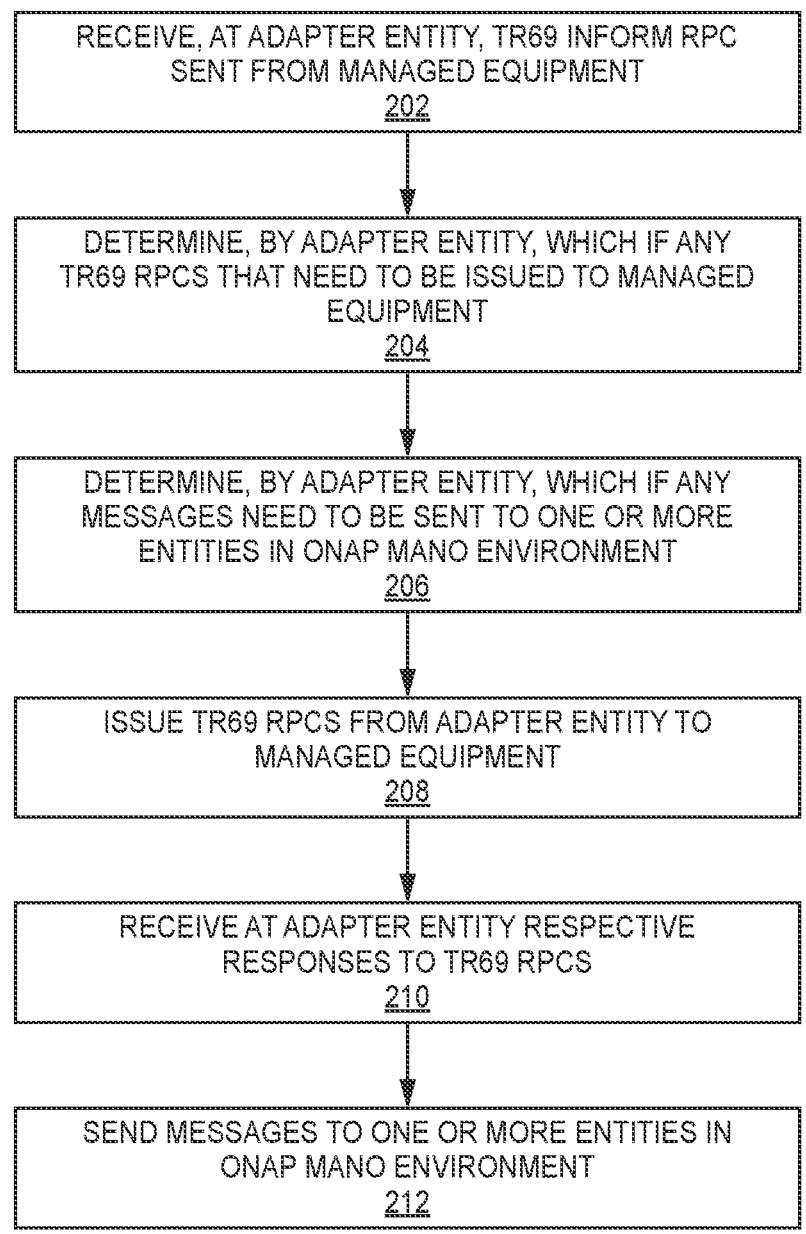

FIG. 2 comprises a high-level flowchart illustrating one exemplary embodiment of a method of managing equipment used to implement a radio access network (RAN) that is configured to wirelessly communicate with user equipment (UE).

Figure 1A:
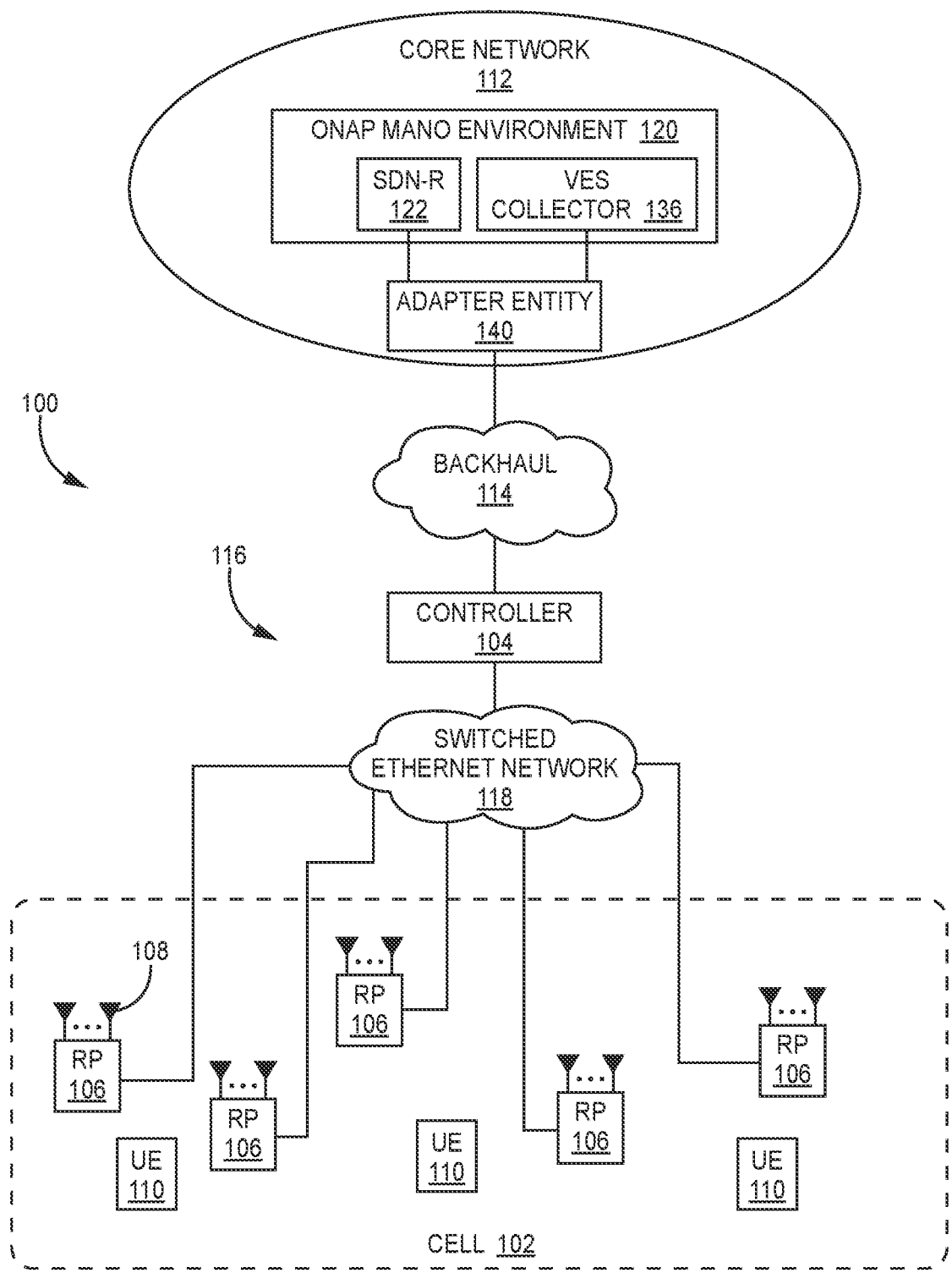
FIG. 1A is a block diagram illustrating one exemplary embodiment of a radio access network (RAN) system suitable for use with the adapter entity described below.
Figure 1B:
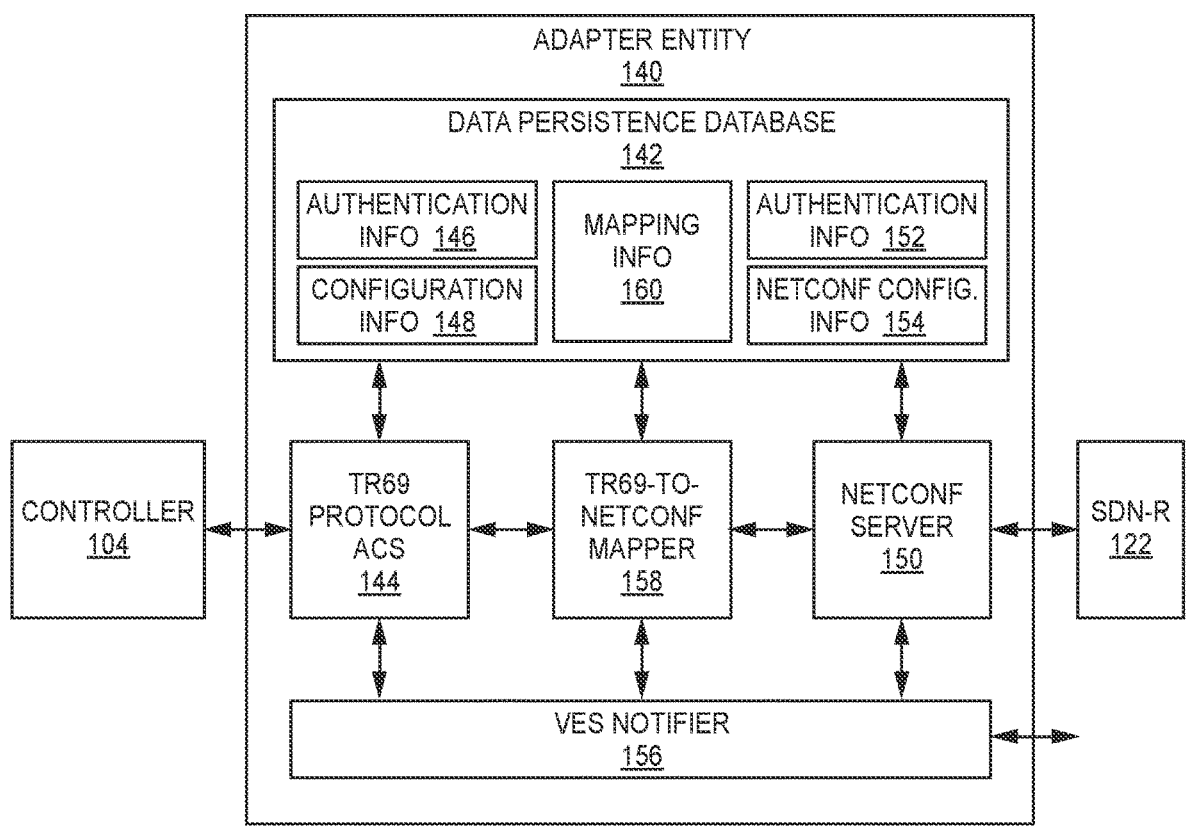
FIG. 1B is a block diagram illustrating the details of the adapter entity 140 shown in FIG. 1A.
Figure 3A:
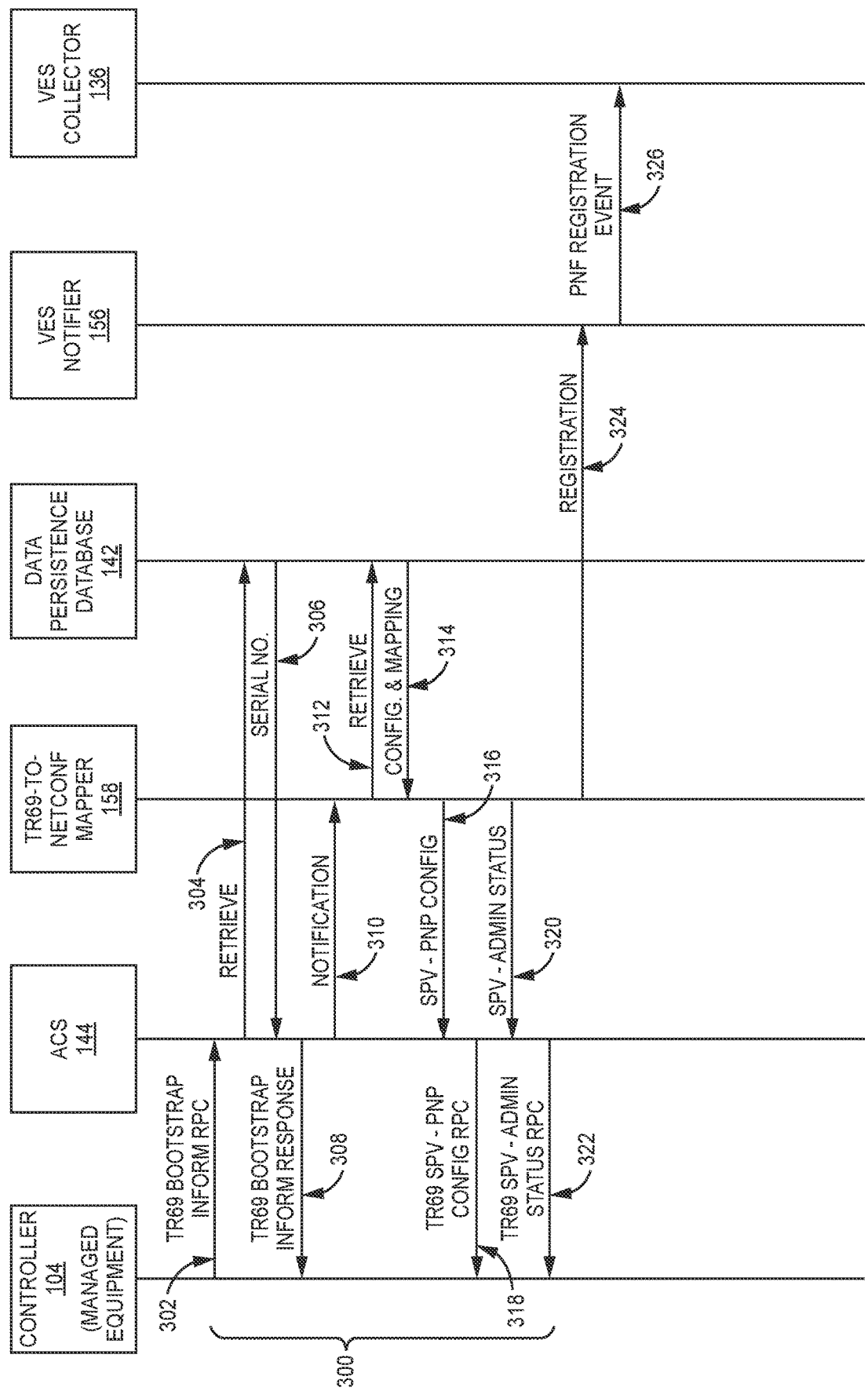

FIG. 3A illustrates the operation of the method of FIG. 2 and the adapter entity of FIG. 1B in connection with a controller sending a TR-069 INFORM RPC that specifies that a BOOTSTRAP event has occurred for the controller.

Figure 3B:
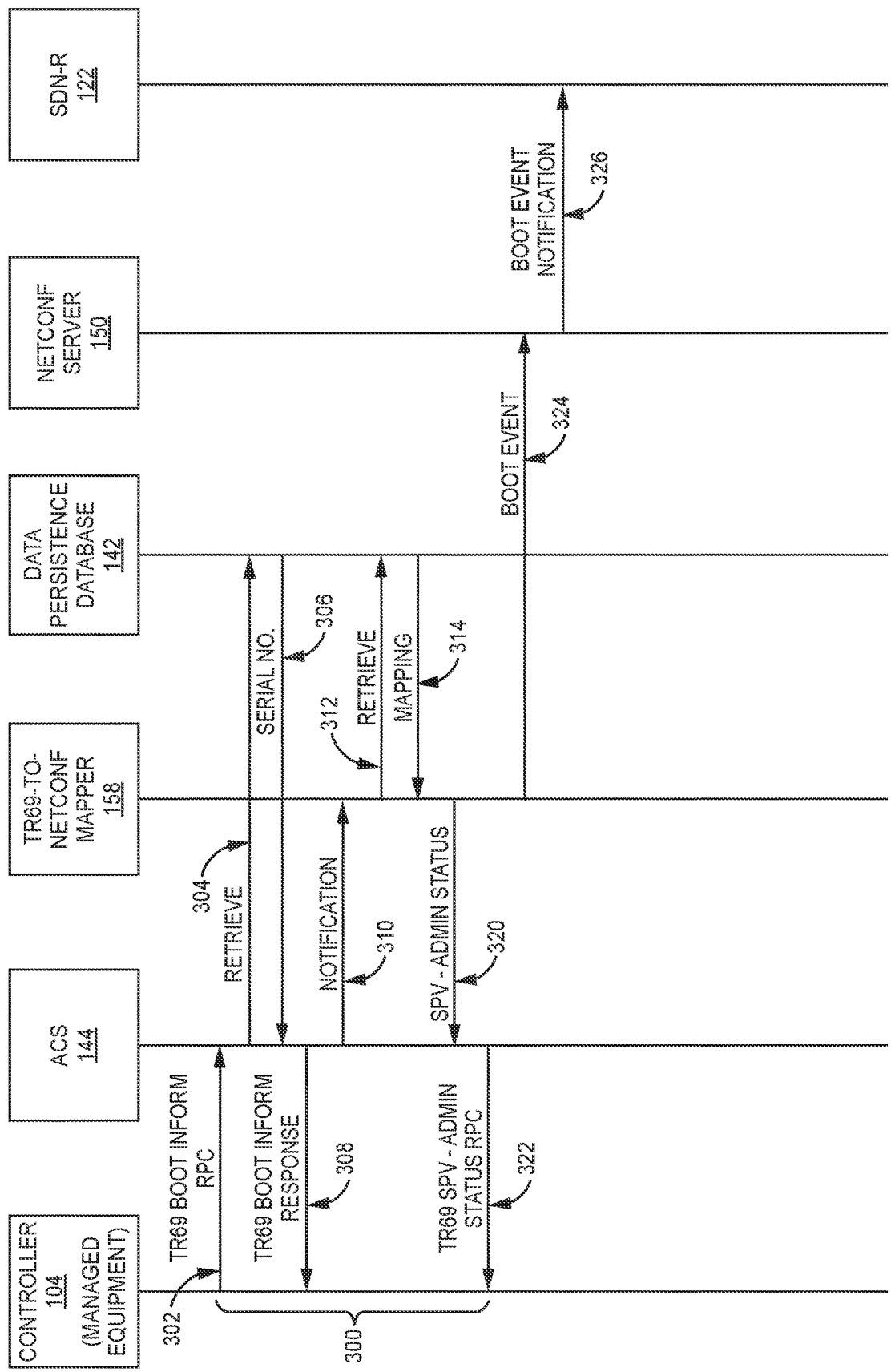

FIG. 3B illustrates the operation of the method of FIG. 2 and the adapter entity of FIG. 1B in connection with a controller sending a TR-069 INFORM RPC that specifies that a BOOT event has occurred for the controller.

Figure 3C:
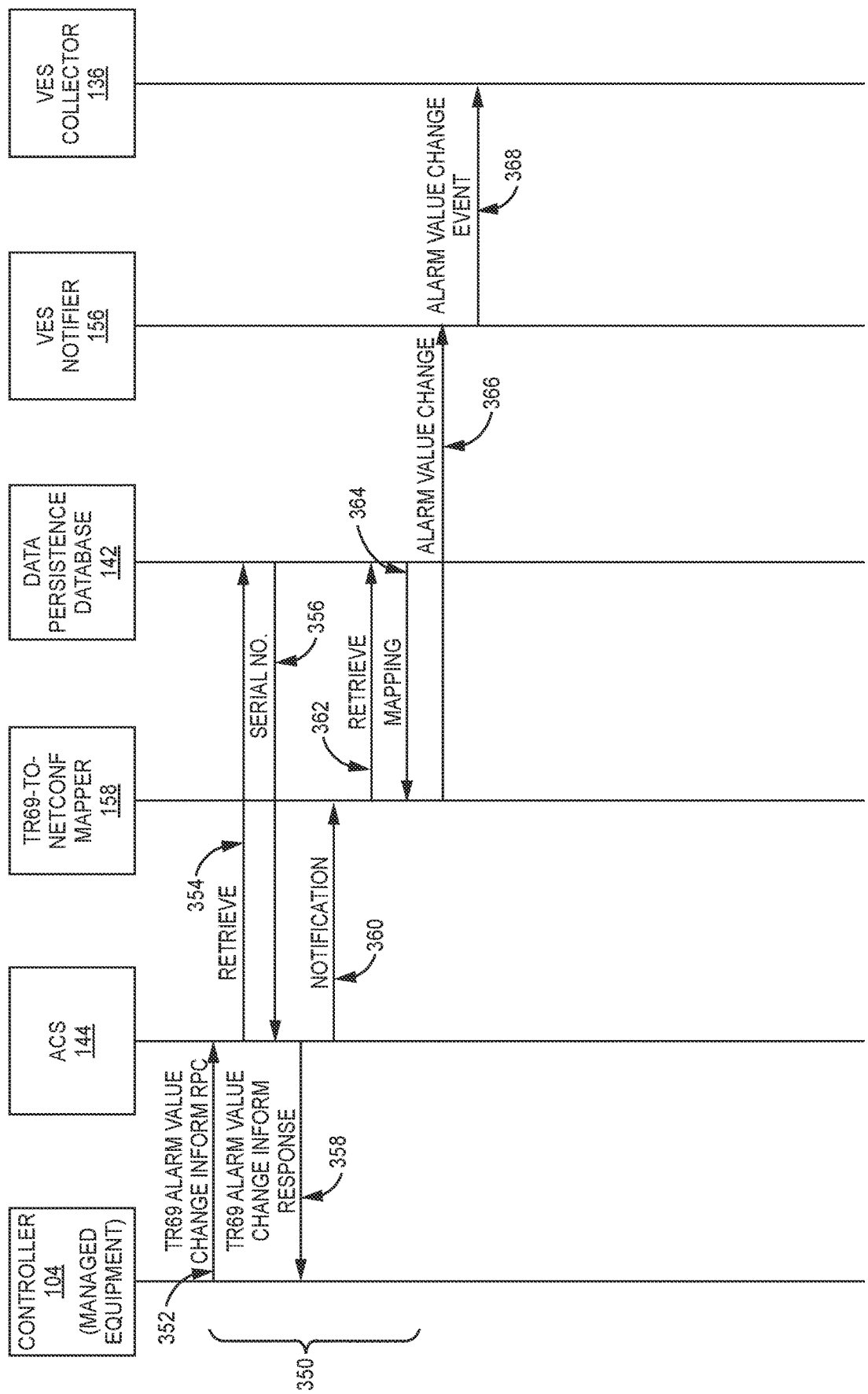

FIG. 3C illustrates the operation of the method of FIG. 2 and the adapter entity of FIG. 1B in connection with a controller sending a TR-069 INFORM RPC that specifies that an ALARM VALUE CHANGE event has occurred for the controller.

Figure 4:
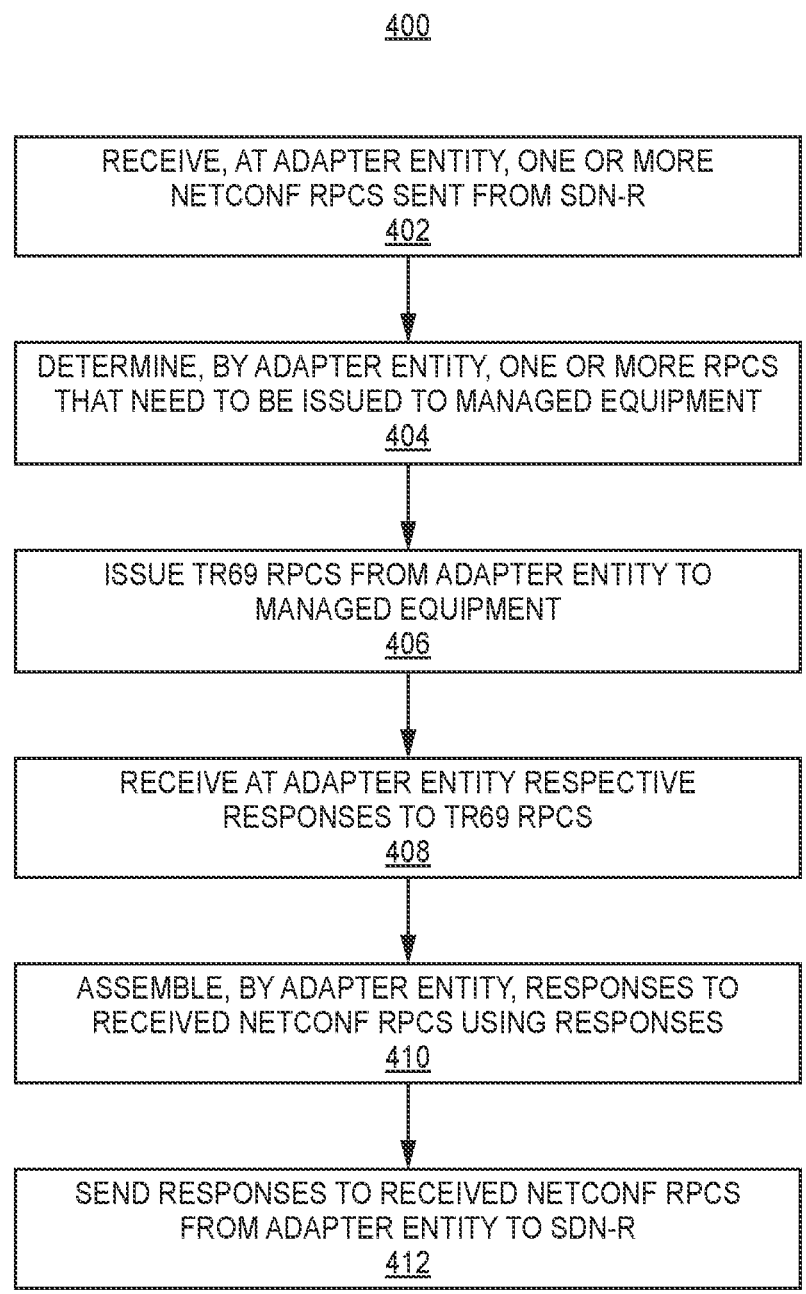

FIG. 4 comprises a high-level flowchart illustrating one exemplary embodiment of a method of managing equipment used to implement a radio access network (RAN) that is configured to wirelessly communicate with user equipment (UE).

Figure 5A:
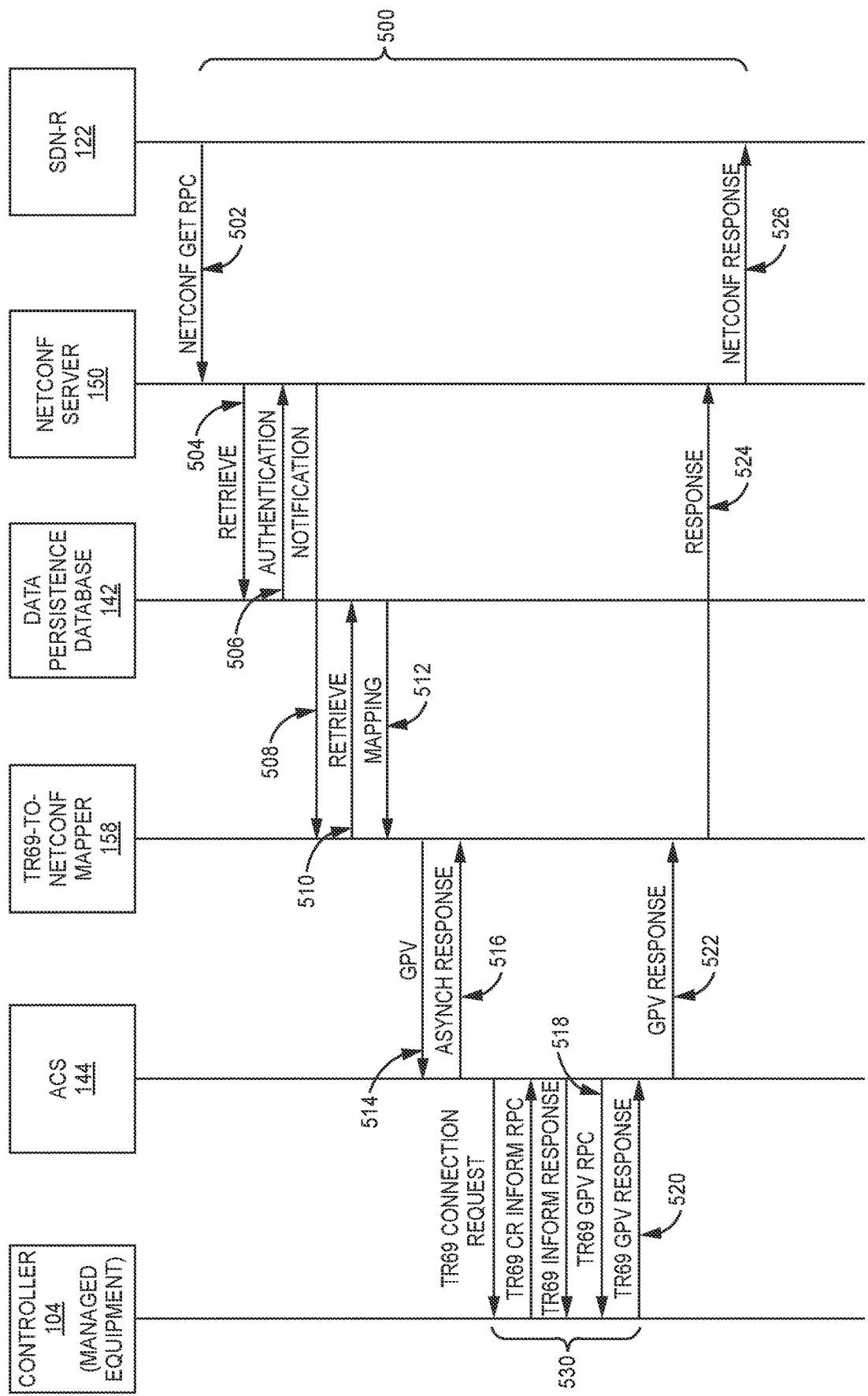

FIG. 5A illustrates the operation of the method of FIG. 4 and the adapter entity of FIG. 1B in connection with a SDN-R sending a NETCONF RPC that specifies that a "get" operation be performed for a controller.

Figure 5B:
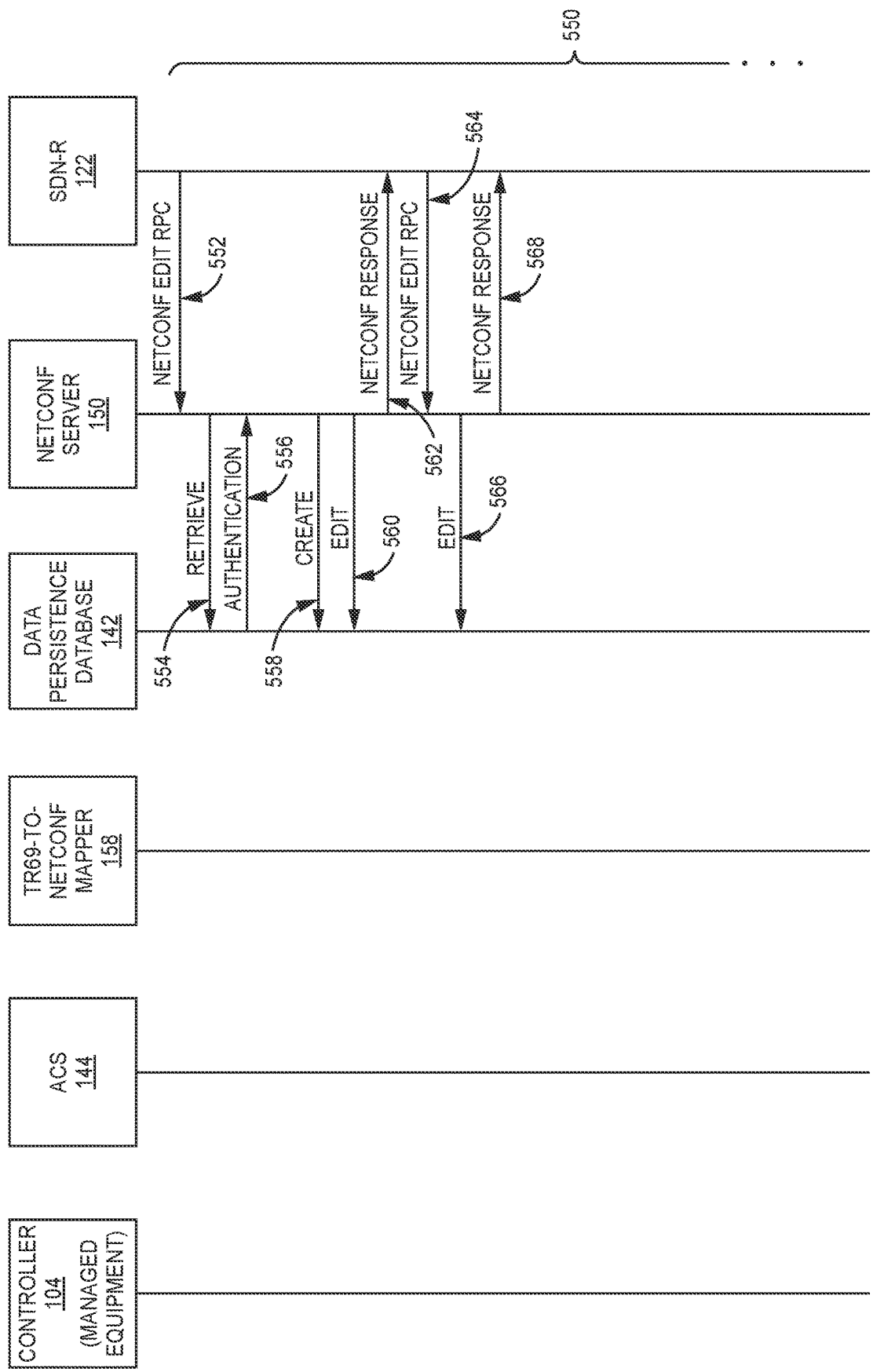
Figure 5C:
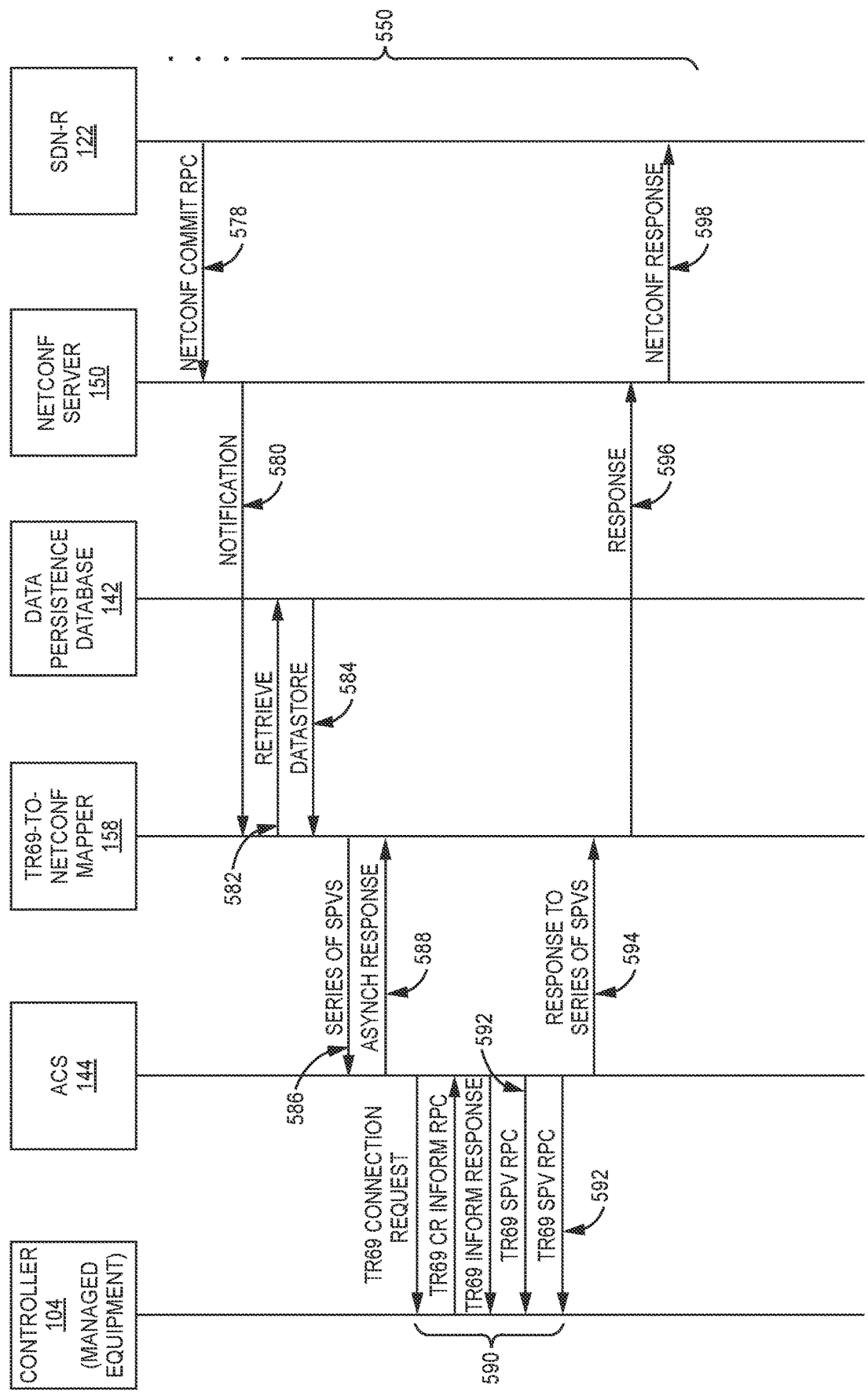

FIGS. 5B-5C illustrate the operation of the method of FIG. 4 and the adapter entity of FIG. 1B in connection with a SDN-R sending multiple NETCONF EDIT-CONFIG RPCs involved with a single, larger transaction involving multiple items of information.

Like reference numbers and designations in the various drawings indicate like elements.

DETAILED DESCRIPTION

FIG. 1A is a block diagram illustrating one exemplary embodiment of a radio access network (RAN) system 100 suitable for use with the adapter entity described below. The RAN system 100 shown in FIG. 1A implements a base station. The RAN system 100 can also be referred to here as a "base station" or "base station system." It is to be understood that the adapter entity can be used with other types of RAN nodes or devices (such as a femtocell access point (FAP)).

In the exemplary embodiment shown in FIG. 1A, the system 100 is implemented at least in part using a centralized or cloud RAN (C-RAN) architecture that employs, for each cell (or sector) 102 served by the system 100, at least one baseband unit 104 and multiple radio points (RPs) 106. The system 100 is also referred to here as a "C-RAN system" 100. Each RP 106 is remotely located from each baseband unit 104 serving it. Also, in this exemplary embodiment, at least one of the RPs 106 is remotely located from at least one other RP 106 serving that cell 102. The baseband units 104 are also referred to here as "baseband controllers" 104 or just "controllers" 104.

Moreover, the RAN system 100 can be implemented in accordance with one or more public standards and specifications. For example, the RAN system 100 can be implemented using a RAN architecture and/or RAN interfaces defined by the 0-RAN Alliance. ("0-RAN" is an acronym for "Open RAN".) In such an 0-RAN example, the baseband units 104 and radio points 106 can be implemented as 0-RAN distributed units (DUs) and 0-RAN remote units (RUs), respectively, in accordance with the 0-RAN specifications. The RAN system 100 can be implemented in other ways.

Each RP 106 includes or is coupled to one or more antennas 108 via which downlink RF signals are radiated to various items of user equipment (UE) 110 and via which uplink RF signals transmitted by UEs 110 are received.

The system 100 is coupled to a core network 112 of the associated wireless network operator over an appropriate backhaul 114 (such as the Internet). Also, each controller 104 is communicatively coupled to the RPs 106 served by it using a fronthaul network 116. Each of the controllers 104 and RPs 106 include one or more network interfaces (not shown) in order to enable the controllers 104 and RPs 106 to communicate over the fronthaul network 116.

In one implementation, the fronthaul 116 that communicatively couples each controller 104 to the RPs 106 is implemented using a switched ETHERNET network 118. In such an implementation, each controller 104 and RP 106 includes one or more ETHERNET interfaces for communicating over the switched ETHERNET network 118 used for the fronthaul 116. However, it is to be understood that the fronthaul between each controller 104 and the RPs 106 served by it can be implemented in other ways.

Generally, for each cell 102 implemented by the C-RAN 100, each controller 104 serving the cell 102 performs the LAYER-3 and LAYER-2 functions for the particular wireless interface used for that cell 102. Also, for each cell 102 implemented by the C-RAN 100, each corresponding controller 104 serving the cell 102 performs some of the LAYER-1 functions for the particular wireless interface used for that cell 102. Each of the RPs 106 serving that cell 102 perform the LAYER-1 functions not performed by each such controller 104 as well as implementing the basic RF and antenna functions.

Each controller 104 and RP 106 (and the functionality described as being included therein), as well as the system 100 more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" or "circuits" configured to implement at least some of the associated functionality. When implemented in software, such software can be implemented in software or firmware executing on one or more suitable programmable processors or configuring a programmable device (for example, processors or devices included in or used to implement special-purpose hardware, general-purpose hardware, and/or a virtual platform). Such hardware or software (or portions thereof) can be implemented in other ways (for example, in an application specific integrated circuit (ASIC), etc.). Also, the RF functionality can be implemented using one or more RF integrated circuits (RFICs) and/or discrete components. Each controller 104, RP 106, and the system 100 more generally, can be implemented in other ways.

In the particular embodiment shown in FIG. 1A, the C-RAN 100 is configured to use one or more Third Generation (3G) wireless interfaces (such as the Universal Mobile Telecommunications Service (UMTS) wireless interfaces), Fourth Generation (4G) wireless interfaces (such as the Long Term Evolution (LTE) wireless interfaces), 5th Generation (5G) wireless interfaces, and/or combinations thereof (for example, the C-RAN 100 can be configured to support both 5G and LTE wireless interfaces, protocols, and architectures)). However, it is to be understood that other embodiments can be implemented in other ways.

In the exemplary embodiment shown in FIG. 1A, the wireless operator that is using the system 100 employs an Open Network Automation Platform (ONAP) management and orchestration (MANO) environment 120 in order to manage the equipment in the system 100. The ONAP MANO environment 120 comprises an ONAP Software Defined Network Radio instance for radio technologies (SDN-R) 122. It is to be understood, however, that the adapter entity 140 and the techniques described here can be used with other similar management entities and systems (for example, other management entities and systems that supports functions like the SDN-R 122 and/or that supports functions like the VES Collector function 136 (described below)).

In general, the SDN-R 122 is implemented in a conventional manner and only those features relevant to the present disclosure are described in detail below (though it is to be understood that the SDN-R 122 includes other features known to one of skill in the art). In one implementation, the SDN-R 122 is segregated into a device manager function and a web services function. In such an implementation, the SDN-R device manager function implements a NETCONF client for interacting with the devices it manages. In such an implementation, the SDN-R web services function can implement web applications and application programming interfaces (APIs). Client devices (such as personal computers, tablets, or smartphones) can access and execute the web applications implemented by the SDN-R web services function. Client devices can also execute local applications that use one or more of the APIs implemented by the SDN-R web services function. In the exemplary embodiment shown in FIG. 1A, the ONAP MANO environment 120 further comprises a VNF Event Streaming (VES) Collector function 136 that is configured to filter, transport, and process data used by the ONAP MANO environment 120. ("VNF" is an acronym for "Virtual Network Function" or "Virtualized Network Function.")

The ONAP MANO environment 120 is communicatively coupled to the controller 104, for example, via the Internet (or other network used to implement the backhaul 114). In the exemplary embodiment shown in FIG. 1A, the ONAP MANO environment 120 is configured to interact with equipment that it manages using NETCONF. That is, the "southbound" interface (the one that interacts with the managed equipment) of the ONAP MANO environment 120 uses NETCONF. However, in this exemplary embodiment, the controller 104 includes management plane functionality (shown in FIG. 1B) that is configured to communicate with a management system using the TR-069 protocol.

In order to enable the ONAP MANO environment 120 to use NETCONF to manage the controller 104, an adapter entity 140 is used. The adapter entity 140 is configured to dynamically map NETCONF requests and responses to and from TR-069 Protocol requests and responses.

The adapter entity 140 and any of the specific features described here as being implemented by the adapter entity 140, can be implemented in hardware, software, or combinations of hardware and software, and the various implementations (whether hardware, software, or combinations of hardware and software) can also be referred to generally as "circuitry" or a "circuit" or "circuits" configured to implement at least some of the associated functionality. When implemented in software, such software can be implemented in software or firmware executing on one or more suitable programmable processors or configuring a programmable device (for example, processors or devices included in or used to implement special-purpose hardware, general-purpose hardware, and/or a virtual platform). Such hardware or software (or portions thereof) can be implemented in other ways (for example, in an application specific integrated circuit (ASIC), etc.). The adapter entity 140 can be implemented in other ways.

In this exemplary embodiment, the adapter entity 140 is implemented in software that runs on a server or other computer. For example, the adapter entity 140 can be implemented as software that runs on a server on which at least some of the software that implements the ONAP MANO environment 120 runs or on another server deployed near such a server. The adapter entity 140 can be implemented in other ways (for example, implemented in a RAN device that implements the TR-069 protocol).

FIG. 1B is a block diagram illustrating the details of the adapter entity 140 shown in FIG. 1A.

In the exemplary embodiment shown in FIGS. 1A and 1B, the ONAP MANO environment 120 is configured to be deployed in an environment that uses containers and an orchestration solution. More specifically, in this embodiment, the ONAP MANO environment 120 is configured to be deployed in an environment that uses one or more Kubernetes clusters. As a result, the adapter entity 140, in such an embodiment can be implemented as a Kubernetes pod or container for deployment in such a Kubernetes cluster.

In the exemplary embodiment shown in FIG. 1B, the adapter entity 140 comprises a data persistence database 142 configured to store data used by the adapter entity 140. In one implementation, the data persistence database 142 is implemented using a MariaDB database container instance.

In this exemplary embodiment, the adapter entity 140 further comprises an TR-069 Protocol auto configuration server (ACS) module 144 that is configured to implement the ACS functionality specified in the TR-069 specification. The ACS module 144 is also referred to here as the "auto configuration server" 144 or the "ACS" 144. As a part of this, the ACS 144 is configured to communicate with the controller 104 using the TR-069 protocol. In this exemplary embodiment, the adapter entity 140 is configured to store data used by the ACS 144 in the data persistence database 142. For example, authentication information 146 can be stored in the data persistence database 142 for use by the ACS 144 both to authenticate TR-069 sessions with the controller 104 and to authenticate the controller 104 itself. Also, configuration information 148 can be stored in the data persistence database 142 for use by the ACS 144 to automatically configure the controller 104 when it initially boots up. The data persistence database 142 can be configured to support a command-line interface (CLI) to import a file containing factory-configured information including, for example, the authentication information 146 and the configuration information 148. The authentication information 146 can include, for example, preshared keys and a device identifier for each controller 104. In the example described here, the device identifier for each controller 104 comprises a serial number assigned to each controller 104. The adapter entity 140 can be configured so that the content and format of the initial configuration information 148 is implemented in accordance with the 3GPP Configuration Management Extensible Mark-up Language (XML) definitions and formats defined in 3GPP Technical Specification (TS) 32.594.

In this exemplary embodiment, the adapter entity 140 further comprises a NETCONF server 150 that is configured to communicate with the SDN-R 122 using the NETCONF protocol. The NETCONF server 150 (and the adapter entity 140 more generally) is configured to support both the basic mandatory NETCONF protocol features and any additional non-mandatory NETCONF protocol features that the NETCONF management entities that the adapter entity 140 is being used with have been extended to support.

In this exemplary embodiment, the adapter entity 140 is configured to store data used by the NETCONF server 150 in the data persistence database 142. For example, authentication information 152 and NETCONF configuration information 154 can be stored in the data persistence database 142 for use by the NETCONF server 150 to authenticate sessions with the SDR-R 122 and, optionally, to store and edit NETCONF datastores. The NETCONF datastores included in the NETCONF configuration information 154 are defined in accordance with a Yang model built based on the Technical Reports 196 (TR-196) and 181 (TR-181) specifications promulgated by the Broadband Forum as well as vendor-specific extensions defined in compliance with Broadband Forum data model specification.

In this exemplary embodiment, the adapter entity 140 further comprises a VES Notifier module 156 that is configured to communicate with the other entities of the adapter entity 140. For example, the other entities in the adapter entity 140 can be configured to use the REST protocol to push data to the VES Notifier 156, which validates, filters, and packages the pushed data from the various entities in the adapter entity 140 and communicates such packaged data to the VES Collector function 136 included in the ONAP MANO environment 120. In this exemplary embodiment, the adapter entity 140 is configured to store data used by the VES Notifier 156 in the data persistence database 142.

In this exemplary embodiment, the adapter entity 140 further comprises a TR-069-to-NETCONF mapper module 158 that is configured to dynamically map NETCONF remote procedure calls and responses to and from TR-069 Protocol remote procedure calls and responses. In this exemplary embodiment, the adapter entity 140 is configured to store data used by the TR-069-to-NETCONF mapper module 158 in the data persistence database 142. For example, mapping information 160 can be stored in the data persistence database 142 that is used by the TR-069-to-NETCONF mapper module 158 to determine zero, one, or more TR-069 RPCs to be sent by the TR-069 protocol ACS 144 to the controller 104 in response a TR-069 INFORM RPC received from the controller 104 and is used by the TR-069-to-NETCONF mapper module 158 to determine one, or more TR-069 RPCs to be sent by the TR-069 protocol ACS 144 to the controller 104 in response a NETCONF RPC received from the SDN-R 122.

This mapping is done by the TR-069-to-NETCONF mapper module 158 when the controller 104 initiates a transaction with the adapter entity 140 (for example, when the controller 104 is initially powered on or reboots or when the controller 104 notifies the adapter entity 140 that a parameter value has changed) and also when the SDN-R 122 initiates a transaction with the adapter entity 140 (for example, when the SDN-R 122 is used to get or edit the configuration of the controller 104). One example of how this mapping process is performed when the controller 104 initiates a transaction is described below in connection with FIG. 2, and examples of this mapping process is performed are described below in connection with FIGS. 3A-3C. One example of how this mapping process is performed when the SDN-R 122 initiates a transaction is described below in connection with FIG. 4, and examples of this mapping process is performed are described below in connection with FIGS. 5A-5C.

FIG. 2 comprises a high-level flowchart illustrating one exemplary embodiment of a method 200 of managing equipment used to implement a radio access network (RAN) that is configured to wirelessly communicate with user equipment (UE). The RAN equipment that is being managed is also referred to here as the "managed equipment."

The embodiment of method 200 shown in FIG. 2 is described here as being implemented by the adapter entity 140 in order to manage the controller 104 of the C-RAN 100 of FIGS. 1A-1B (though it is to be understood that other embodiments can be implemented in other ways). The embodiment of method 200 shown in FIG. 2 addresses situations where the managed equipment (the controller 104 in this example) initiates the transaction with the adapter entity 140.

The blocks of the flow diagram shown in FIG. 2 have been arranged in a generally sequential manner for ease of explanation; however, it is to be understood that this arrangement is merely exemplary, and it should be recognized that the processing associated with method 200 (and the blocks shown in FIG. 2) can occur in a different order (for example, where at least some of the processing associated with the blocks is performed in parallel and/or in an event-driven manner). Also, most standard exception handling is not described for ease of explanation; however, it is to be understood that method 200 can and typically would include such exception handling.

Method 200 comprises receiving, by the adapter entity 140, a TR-069 remote procedure call (RPC) sent from the controller 104 that specifies a particular event associated with the controller 104 has occurred (block 202). The TR-069 RPC is received as a part of a TR-069 session initiated by the controller 104 (and is received after the controller 104 has successfully authenticated the ACS 144 at the HTTP/HTTPS level using the preshared keys included in the authentication information 146 stored in the data persistence database 142 for that controller 104). The TR-069 RPC in this example comprises a TR-069 INFORM RPC that specifies a TR-069 event associated with the controller 104 (for example, a BOOTSTRAP event, a BOOT event, an ALARM VALUE CHANGE event, a PERIODIC event, a CONNECTION REQUEST event, a TRANSFER COMPLETE event, and an AUTONOMOUS TRANSFER COMPLETE event) has occurred. The TR-069 INFORM RPC is received as a part of a TR-069 session initiated by the controller 104 (and is received after the TR-069 session has been successfully authenticated). The TR-069 INFORM RPC includes a Device Identifier (DeviceID) tag, which in this example includes the serial number assigned to the controller 104. The TR-069 protocol ACS 144 authenticates the controller 104 by checking if the serial number included in the TR-069 INFORM RPC matches the serial number included in the authentication information 146 stored in the data persistence database 142 for that controller 104. If the authentication of the controller 104 is successful, the TR-069 protocol ACS 144 sends, to the controller 104, an INFORM response indicating that the authentication was successful and the TR-069 session will continue.

Method 200 further comprises determining, by the TR-069-to-NETCONF mapper module 158, which, if any, TR-069 remote procedure calls need to be issued to the controller 104 in response to the received TR-069 INFORM RPC (block 204) and which, if any, messages need to be sent to one or more entities in the ONAP MANO environment 120 in response to the received TR-069 INFORM RPC (block 206). After successfully authenticating the controller 104, the TR-069 protocol ACS 144 notifies the TR-069-to-NETCONF mapper module 158 of the TR-069 INFORM RPC received from the controller 104. In response to this notification, the TR-069-to-NETCONF mapper module 158 retrieves the mapping information 160 stored in the data persistence database 142 for that controller 104 and uses it to determine zero, one, or more TR-069 RPCs to have the TR-069 protocol ACS 144 issue to the controller 104 in response to the received TR-069 INFORM RPC. Also, the TR-069-to-NETCONF mapper module 158 uses the mapping information 160 to determine zero, one, or more other messages to have sent to one or more entities in the ONAP MANO environment 120 in response to the received TR-069 INFORM RPC.

Method 200 further comprises causing, by the TR-069-to-NETCONF mapper module 158, the TR-069 protocol ACS 144 to issue to the controller 104 any TR-069 remote procedure calls that need to be issued in response to the received TR-069 INFORM RPC (block 208) and receiving, by the TR-069-to-NETCONF mapper module 158, the respective responses to the TR-069 remote procedure calls (block 210). In this example, the TR-069-to-NETCONF mapper module 158 causes the TR-069 protocol ACS 144 to issue any needed TR-069 remote procedure calls during the same TR-069 session in which the TR-069 INFORM RPC was received. In response to receiving the TR-069 remote procedure calls issued by the TR-069 protocol ACS 144, the controller 104 sends respective responses to the TR-069 protocol ACS 144, which forwards any such responses to the TR-069-to-NETCONF mapper module 158 for updating the data stored in the data persistence database 142 for that controller 104 (for example, by updating session data associated with the controller 104).

Method 200 further comprises causing, by the TR-069-to-NETCONF mapper module 158, any necessary messages to be sent to one or more entities in the ONAP MANO environment 120 in response to the received TR-069 INFORM RPC (block 212). If the TR-069-to-NETCONF mapper module 158 determines that data related to the type of event specified in the TR-069 INFORM RPC received from the controller 104 should be sent to an entity in the ONAP MANO environment 120, the TR-069-to-NETCONF mapper module 158 provides, to the appropriate entity in the adapter entity 140 (for example, the NETCONF server 150 or the VES Notifier 156), the relevant data from the initial TR-069 INFORM RPC and/or from one or more of the responses to any of the TR-069 RPCs sent by the adapter entity 140 to the controller 104. That entity in the adapter entity 140 communicates such data to the appropriate one or more entities in the ONAP MANO environment 120. For example, as described below in connection with FIG. 3A, if the TR-069 INFORM RPC specifies that a BOOTSTRAP event has occurred for the controller 104, the TR-069-to-NETCONF mapper module 158 determines that a Physical Network Functions (PNF) registration event message be sent to the VES Collector 136 in the ONAP MANO environment 120 in order for the VES Collector 136 to be informed that the controller 104 is being bootstrapped and configured and that event information for the controller 104 can be reported. Thus, the TR-069-to-NETCONF mapper module 158 causes the VES Notifier 156 to send a PNF registration event message for the controller 104 to the VES Collector 136. In another example described below in connection with FIG. 3B, if the TR-069 INFORM RPC specifies that a BOOT event has occurred for the controller 104, the TR-069-to-NETCONF mapper module 158 determines that the SDN-R 122 in the ONAP MANO environment 120 should be notified of the BOOT event occurring at the controller 104. Thus, the TR-069-to-NETCONF mapper module 158 causes the NETCONF server 150 to send a BOOT event notification message for the controller 104 to the SDN-R 122.

The operation of method 200 is illustrated in FIGS. 3A-3C connection with examples in which TR-069 INFORM RPCs that specify BOOTSTRAP, BOOT, and ALARM VALUE CHANGE events, respectively, have occurred for the controller 104. However, it is to be understood that method 200 can be used with TR-069 INFORM RPCs that specify that other types of events have occurred.

FIG. 3A illustrates the operation of method 200 and the adapter entity 140 in connection with the controller 104 sending a TR-069 INFORM RPC that specifies that a BOOTSTRAP event has occurred for the controller 104. In this example, the adapter entity 140 is configured to automatically configure the controller 104.

Except as described below, the TR-069 and NETCONF sessions shown in FIG. 3A are implemented in a conventional manner and only those messages and actions relevant to the present disclosure are described here and shown in FIG. 3A. However, it is to be understood that the TR-069 and NETCONF sessions would include these other messages and actions even though they are not explicitly described here or shown in FIG. 3A.

In this example, the controller 104 initiates a TR-069 session 300 with the TR-069 protocol ACS 144 by sending a TR-069 INFORM RPC 302 that indicates that a BOOTSTRAP event has occurred at that controller 104 (and is done after the controller 104 has successfully authenticated the ACS 144 at the HTTP/HTTPS level using the preshared keys included in the authentication information 146 stored in the data persistence database 142 for that controller 104). The TR-069 BOOTSTRAP INFORM RPC 302 includes a DeviceID tag, which in this example includes the serial number assigned to the controller 104. The TR-069 protocol ACS 144 authenticates the controller 104 by retrieving 304 and 306 the serial number included in the authentication information 146 stored in the data persistence database 142 for that controller 104 and checking if the serial number included in the TR-069 BOOTSTRAP INFORM RPC matches the retrieved one. In this example, the controller 104 is successfully authenticated and the TR-069 protocol ACS 144 sends, to the controller 104, a response 308 to the TR-069 BOOTSTRAP INFORM RPC indicating that the authentication was successful and the session 300 continues. After successfully authenticating the controller 104, the TR-069 protocol ACS 144 notifies 310 the TR-069-to-NETCONF mapper module 158 of the TR-069 INFORM RPC for the controller 104. In response to this notification, the TR-069-to-NETCONF mapper module 158 retrieves 312 and 314 the configuration information 148 and the mapping information 160 stored in the data persistence database 142 for that controller 104 and uses the mapping information 160 to determine one or more TR-069 Set Parameter Value (SPV) RPCs to issue to the controller 104 in order to configure the controller 104 in accordance with the retrieved configuration information 148. The TR-069-to-NETCONF mapper module 158 causes 316 the TR-069 protocol ACS module 144 to send those TR-069 SPV RPCs 318 (labelled "SPV—PnP Config" 318 in FIG. 3A) to the controller 104 during that TR-069 session 300. In response to receiving those TR-069 SPV RPCs 318, the controller 104 configures itself as indicated in the TR-069 SPV RPCs 318. Also, the TR-069-to-NETCONF mapper module 158 determines that one or more TR-069 SPV RPCs should be issued to the controller 104 in order to inform the controller 104 of the current status of the network 100 (and its associated management plane). The TR-069-to-NETCONF mapper module 158 causes 320 the TR-069 protocol ACS 144 to send those TR-069 SPV RPCs 322 (labelled "SPV—Admin Status" 322 in FIG. 3A) to the controller 104 during that TR-069 session 300.

Moreover, in this example, the TR-069-to-NETCONF mapper module 158 determines that a PNF registration event message be sent to the VES Collector 136 in the ONAP MANO environment 120 in order for the VES Collector 136 to be informed that the controller 104 is being bootstrapped and configured and that event information for the controller 104 can be reported. Thus, the TR-069-to-NETCONF mapper module 158 causes 324 the VES Notifier 156 to send a PNF registration event message 326 for the controller 104 to the VES Collector 136.

FIG. 3B illustrates the operation of method 200 and the adapter entity 140 in connection with the controller 104 sending a TR-069 INFORM RPC that specifies that a BOOT event has occurred for the controller 104. In this example, the adapter entity 140 does not automatically configure the controller 104. The example shown in FIG. 3B is the same as the example shown in FIG. 3A, except as described below. In the example shown in FIG. 3B, the TR-069-to-NETCONF mapper module 158 does not retrieve configuration information 148 stored in the data persistence database 142 for that controller 104 and no TR-069 SPV RPCs are issued from the TR-069 protocol ACS 144 to the controller 104 in order to configure the controller 104. Also, in the example shown in FIG. 3B, the TR-069-to-NETCONF mapper module 158 determines that the SDN-R 122 in the ONAP MANO environment 120 should be notified of the BOOT event occurring at the controller 104. Thus, the TR-069-to-NETCONF mapper module 158 causes 324 the NETCONF server 150 to send a BOOT event notification message 326 for the controller 104 to the SDN-R 122.

FIG. 3C illustrates the operation of method 200 and the adapter entity 140 in connection with the controller 104 sending a TR-069 INFORM RPC that specifies that an ALARM VALUE CHANGE event has occurred for the controller 104.

Except as described below, the TR-069 and NETCONF sessions shown in FIG. 3C are implemented in a conventional manner and only those messages and actions relevant to the present disclosure are described here and shown in FIG. 3C. However, it is to be understood that the TR-069 and NETCONF sessions would include these other messages and actions even though they are not explicitly described here or shown in FIG. 3C.

In this example, the controller 104 initiates a TR-069 session 350 with the TR-069 protocol ACS 144 by sending a TR-069 INFORM RPC 352 that indicates that an ALARM VALUE CHANGE event has occurred at that controller 104 (and is done after the controller 104 has successfully authenticated the ACS 144 at the HTTP/HTTPS level using the preshared keys included in the authentication information 146 stored in the data persistence database 142 for that controller 104). The TR-069 ALARM VALUE CHANGE INFORM RPC 352 includes a DeviceID tag, which in this example includes the serial number of the controller 104.

The TR-069 protocol ACS 144 authenticates the controller 104 by retrieving 354 and 356 the serial number included in the authentication information 146 stored in the data persistence database 142 for that controller 104 and checking if the serial number included in the TR-069 ALARM VALUE CHANGE INFORM RPC matches the retrieved one. In this example, the controller 104 is successfully authenticated and the TR-069 protocol ACS 144 sends, to the controller 104, a response 358 to the TR-069 ALARM VALUE CHANGE INFORM RPC indicating that the authentication was successful and the TR-069 session 350 continues. After successfully authenticating the controller 104, the TR-069 protocol ACS 144 notifies 360 the TR-069-to-NETCONF mapper module 158 of the TR-069 INFORM RPC for the controller 104. In response to this notification, the TR-069-to-NETCONF mapper module 158 retrieves 362 and 364 the mapping information 160 stored in the data persistence database 142 for that controller 104.

In this example, the TR-069-to-NETCONF mapper module 158 uses the mapping information 160 to determine that an ALARM VALUE CHANGE event message be sent to the VES Collector 136 in the ONAP MANO environment 120 to report that ALARM VALUE CHANGE for the controller 104. Thus, the TR-069-to-NETCONF mapper module 158 causes 366 the VES Notifier 156 to send to the VES Collector 136 an ALARM VALUE CHANGE event message 368 reporting that ALARM VALUE CHANGE for the controller 104.

FIG. 4 comprises a high-level flowchart illustrating one exemplary embodiment of a method 400 of managing equipment used to implement a radio access network (RAN) that is configured to wirelessly communicate with user equipment (UE). The RAN equipment that is being managed is also referred to here as the "managed equipment."

The embodiment of method 400 shown in FIG. 4 is described here as being implemented by the adapter entity 140 in order to manage the controller 104 of the C-RAN 100 of FIGS. 1A-1B (though it is to be understood that other embodiments can be implemented in other ways). The embodiment of method 400 shown in FIG. 4 addresses situations where the SDN-R 122 initiates the transaction with the adapter entity 140.

The blocks of the flow diagram shown in FIG. 4 have been arranged in a generally sequential manner for ease of explanation; however, it is to be understood that this arrangement is merely exemplary, and it should be recognized that the processing associated with method 400 (and the blocks shown in FIG. 4) can occur in a different order (for example, where at least some of the processing associated with the blocks is performed in parallel and/or in an event-driven manner). Also, most standard exception handling is not described for ease of explanation; however, it is to be understood that method 400 can and typically would include such exception handling.

Method 400 comprises receiving, by the adapter entity 140, one or more NETCONF remote procedure calls (RPCs) sent from the SDN-R 122 of the ONAP MANO environment 120 (block 402). Each NETCONF RPC specifies a particular NETCONF operation to be performed for a particular item of managed equipment (the controller 104 in this example). Each NETCONF RPC is received as a part of a respective NETCONF session initiated by the SDN-R 122 (and is received after the SDN-R 122 has been successfully authenticated). In this example, each NETCONF RPC is received from the SDN-R 122 via the NETCONF server 150 included in the adapter entity 140.

The one or more NETCONF RPCs can include only a single NETCONF RPC. For example, the SDN-R 122 can send a NETCONF RPC specifying that a NETCONF "get" operation be performed in order to retrieve the current configuration and operational state data for the controller 104 or a NETCONF "get-config" operation be performed in order to retrieve the current configuration data for the controller 104 from the NETCONF "running" datastore maintained by the NETCONF server 150 in the data persistence database 142 for the controller 104. Other examples of a NETCONF RPC that can be sent by the SDN-R 122 include a NETCONF RPC specifying that one or more of the following operations be performed: a NETCONF "copy-config" operation; a NETCONF "delete-config" operation; a NETCONF "lock" operation; a NETCONF "unlock" operation; a NETCONF "close-session" operation; and a NETCONF "kill-sessions" operation. Other examples of NETCONF RPCs that can be sent by the SDN-R 122 include any NETCONF RPCs that have been defined as a part of any additional non-mandatory NETCONF protocol features that the NETCONF management entities that the adapter entity 140 is being used with have been extended to support.

The one or more NETCONF RPCs can also include multiple NETCONF RPCs involved in a single, larger transaction involving multiple items of information. For example, the SDN-R 122 can send a NETCONF RPC specifying that a NETCONF "edit-config" operation be performed in order to change one or more configuration parameters of the controller 104 (the managed equipment in this example). When a NETCONF RPC specifying that a NETCONF edit-config operation be performed, the NETCONF server 150 creates a NETCONF "candidate" datastore in the data persistence database 142 for the controller 104 if one has not already been created (by copying the current NETCONF running datastore maintained by the NETCONF server 150 in the data persistence database 142 for the controller 104) and edit the NETCONF candidate datastore by changing one or more configuration parameters specified in the received NETCONF RPC. The configuration parameters are changed so as to have the values specified in the NETCONF RPC. Multiple edit-config operations can be performed in order to edit a NETCONF candidate datastore maintained in the data persistence database 142. Then, the SDN-R 122 can send a NETCONF RPC specifying that a NETCONF "commit" operation be performed in order to have the edited NETCONF candidate datastore stored in the data persistence database 142 become the current NETCONF running datastore for the specified controller 104.

Method 400 further comprises determining, by the TR-069-to-NETCONF mapper module 158, one or more TR-069 remote procedure calls (RPCs) to issue to the controller 104 in order to carry out the NETCONF operation specified in each received NETCONF RPC (block 404).

The NETCONF server 150 notifies the TR-069-to-NETCONF mapper module 158 of each NETCONF RPC received from the SDN-R 122. In response to this notification, the TR-069-to-NETCONF mapper module 158 retrieves the mapping information 160 stored in the data persistence database 142 for that SDN-R 122 and uses it to determine zero, one, or more TR-069 RPCs to have the TR-069 protocol ACS 144 issue to the controller 104 to carry out the NETCONF operation specified in the received NETCONF RPC.

Method 400 further comprises causing, by the TR-069-to-NETCONF mapper module 158, the TR-069 protocol ACS 144 to issue the determined one or more TR-069 remote procedure calls to the controller 104 in order to carry out the NETCONF operation specified in each received NETCONF RPC (block 406) and receiving, by the TR-069-to-NETCONF mapper module 158, the respective responses to the TR-069 remote procedure calls (block 408).

In this example, the TR-069-to-NETCONF mapper module 158 asynchronously instructs the ACS 144 to initiate a TR-069 protocol session with the controller 104 for the one or more received NETCONF RPC. The ACS 144 immediately responds with an operation identifier associated with at least one the NETCONF RPC and proceeds with issuing the TR-069 remote procedure calls to the controller 104 as a part of the TR-069 protocol session initiated with the controller 104 for the received one or more NETCONF RPCs. (The TR-069 protocol session is initiated after the controller 104 has successfully authenticated the ACS 144 at the HTTP/HTTPS level using the preshared keys included in the authentication information 146 stored in the data persistence database 142 for that controller 104.) In response to receiving the TR-069 remote procedure calls issued by the TR-069 protocol ACS 144, the controller 104 sends respective responses. The responses are sent to the TR-069 protocol ACS 144. When the TR-069 protocol session with the controller 104 for that NETCONF RPC is complete, the responses are then provided from the ACS 144 to the TR-069-to-NETCONF mapper module 158. The ACS 144 provides the operation identifier associated with that NETCONF RPC along with the responses so that the TR-069-to-NETCONF mapper module 158 can properly associate the responses with the corresponding NETCONF RPC.

Method 400 further comprises assembling, by the TR-069-to-NETCONF mapper module 158, a response to the received NETCONF RPC using the responses to the TR-069 remote procedure calls (block 410) and sending the response to the received NETCONF RPC to the SDN-R 122 that sent the NETCONF RPC (block 412).

In this example, the TR-069-to-NETCONF mapper module 158 uses the mapping information 160 stored in the data persistence database 142 in order to map data included in the responses to the TR-069 remote procedure calls to the appropriate tags or other parts of a response to the received NETCONF RPC. The TR-069-to-NETCONF mapper module 158 uses the mapping information 160 to assemble the response to the received NETCONF RPC by inserting the received data into the tags or other parts of the response and then sends the response to the SDN-R 122 that sent the received NETCONF RPC. The response is sent via the NETCONF server 150 included in the adapter entity 140.

FIG. 5A illustrates the operation of method 400 and the adapter entity 140 in connection with the SDN-R 122 sending a NETCONF RPC that specifies that a "get" operation be performed for the controller 104.

Except as described below, the TR-069 and NETCONF sessions shown in FIG. 5A are implemented in a conventional manner and only those messages and actions relevant to the present disclosure are described here and shown in FIG. 5A. However, it is to be understood that the TR-069 and NETCONF sessions would include these other messages and actions even though they are not explicitly described here or shown in FIG. 5A.

In the example shown in FIG. 5A, the SDN-R 122 of the ONAP MANO environment 120 initiates a NETCONF session 500 with the NETCONF server 150 of the adapter entity 140 by sending a NETCONF RPC 502 that specifies that a "get" operation be performed for the controller 104. The NETCONF server 150 authenticates the SDN-R 122 by retrieving 504 and 506 the authentication information 152 stored in the data persistence database 142 for that SDN-R 122. In this example, the SDN-R 122 successfully authenticates and the NETCONF server 150 notifies 508 the TR-069-to-NETCONF mapper module 158 of the received NETCONF RPC 502 for the controller 104. In response to this notification, the TR-069-to-NETCONF mapper module 158 retrieves 510 and 512 the mapping information 160 stored in the data persistence database 142 for that controller 104 and uses it to determine one or more TR-069 remote procedure calls to issue to the controller 104 in order to carry out the NETCONF operation specified in the received NETCONF RPC 502. In this example, the NETCONF RPC 502 includes a NETCONF get operation and, as a result, the TR-069-to-NETCONF mapper module 158 determines that one or more TR-069 Get Parameter Value (GPV) RPCs (as defined in the TR-069 CPE WAN Management Protocol Specification document) are to be issued to the controller 104 in order to obtain the configuration and/or state data requested in the get NETCONF RPC 502.

In the example shown in FIG. 5A, the TR-069-to-NETCONF mapper module 158 asynchronously instructs 514 the ACS 144 to initiate a TR-069 protocol session 530 with the controller 104 for the received get NETCONF RPC 502. The ACS 144 immediately responds 516 with an operation identifier associated with the get NETCONF RPC 502 and proceeds with issuing the TR-069 GPV RPC 518 to the controller 104 as a part of the TR-069 protocol session 530 initiated with the controller 104 for the received get NETCONF RPC 502. (The TR-069 protocol session is initiated after the controller 104 has successfully authenticated the ACS 144 at the HTTP/HTTPS level using the preshared keys included in the authentication information 146 stored in the data persistence database 142 for that controller 104.) In response to receiving the TR-069 GPV RPC 518 issued by the TR-069 protocol ACS 144, the controller 104 sends a response 520 to the TR-069 GPV RPC 518. The response 520 is sent to the TR-069 protocol ACS 144. When the TR-069 protocol session 530 with the controller 104 for the received get NETCONF RPC 502 is complete, the response 520 to the TR-069 GPV RPC 518 is then provided from the ACS 144 to the TR-069-to-NETCONF mapper module 158. The ACS 144 provides the operation identifier associated with that NETCONF RPC 502 along with the response 520 so that the TR-069-to-NETCONF mapper module 158 can properly associate the response 520 with the corresponding NETCONF RPC 502.

In the example shown in FIG. 5A, the TR-069-to-NETCONF mapper module 158 uses the mapping information 160 stored in the data persistence database 142 in order to map data included in the TR-069 GPV response 520 to the appropriate tags or other parts of a response 524 to the received NETCONF RPC 502. The TR-069-to-NETCONF mapper module 158 uses the mapping information 160 to assemble the response 524 by inserting the received data into the tags or other parts of the response 524 and then forwards the response 524 to the NETCONF server 150, which sends a NETCONF response 526 based thereon to the SDN-R 122.

FIGS. 5B-5C illustrate the operation of method 400 and the adapter entity 140 in connection with the SDN-R 122 sending multiple NETCONF EDIT-CONFIG RPCs involved with a single, larger transaction involving multiple items of information.

Except as described below, the TR-069 and NETCONF sessions shown in FIGS. 5B-5C are implemented in a conventional manner and only those messages and actions relevant to the present disclosure are described here and shown in FIGS. 5B-5C. However, it is to be understood that the TR-069 and NETCONF sessions would include these other messages and actions even though they are not explicitly described here or shown in FIGS. 5B-5C.

In the example shown in FIGS. 5B-5C, the SDN-R 122 of the ONAP MANO environment 120 sends a series of NETCONF RPCs 552 and 564 specifying that multiple "edit-config" operations are to be performed for the controller 104 (shown in FIG. 5B).

The SDN-R 122 is authenticated in response to receiving each edit-config NETCONF RPC 552 and 564. The NETCONF server 150 authenticates the SDN-R 122 by retrieving 554 and 556 the authentication information 152 stored in the data persistence database 142 for that SDN-R 122. In this example, the SDN-R 122 successfully authenticates.

Also, in response to receiving the first edit-config NETCONF RPC 552, the NETCONF server 150 creates 558 a NETCONF "candidate" datastore in the data persistence database 142 for the controller 104 (assuming one has not already been created). The candidate datastore is created by copying the current NETCONF running datastore maintained by the NETCONF server 150 in the data persistence database 142 for the controller 104. For the first edit-config NETCONF RPC 552 received by the adapter entity 140, the NETCONF server 150 edits 560 the NETCONF candidate datastore by changing one or more configuration parameters specified in the first edit-config NETCONF RPC 552. The configuration parameters are changed so as to have the values specified in the first edit-config NETCONF RPC 552. After making the specified changes, the NETCONF server 150 sends an appropriate response 562 to that edit-config NETCONF RPC 552 indicating that the specified one or more configuration parameters in the NETCONF candidate datastore have been changed.

Likewise, in response to receiving the second edit-config NETCONF RPC 564, the NETCONF server 150 edits 566 the NETCONF candidate datastore by changing one or more configuration parameters specified in the second edit-config NETCONF RPC 564. The configuration parameters are changed so as to have the values specified in the second edit-config NETCONF RPC 564. After making the specified changes, the NETCONF server 150 sends an appropriate response 568 to that edit-config NETCONF RPC 564 indicating that the specified one or more configuration parameters in the NETCONF candidate datastore have been changed.

After the multiple edit-config NETCONF RPCs 552 and 564 are sent, after the NETCONF candidate datastore for the controller 104 is edited by changing the one or more configuration parameters as specified in the various edit-config NETCONF RPCs 552 and 564, and after the various responses 562 and 568 are sent, the SDN-R 122 sends a NETCONF RPC 578 (shown in FIG. 5C) specifying that a NETCONF "commit" operation be performed for the controller 104 in order to have the edited NETCONF candidate datastore stored in the data persistence database 142 become the current NETCONF running datastore for the specified controller 104 and to have controller 104 (the managed equipment) be configured as indicated in the new NETCONF running datastore. In response to receiving the commit NETCONF RPC 578, the NETCONF server 150 notifies 580 the TR-069-to-NETCONF mapper module 158 of the series of edit-config NETCONF RPCs 552 and 564. In response to this notification 580, the TR-069-to-NETCONF mapper module 158 retrieves 582 and 584 the mapping information 160 and candidate datastore stored in the data persistence database 142 for that controller 104 and uses them to determine one or more TR-069 remote procedure calls to issue to the controller 104 in order to carry out the NETCONF operation specified in the series of received NETCONF RPCs. In this example, the TR-069-to-NETCONF mapper module 158 determines that one or more TR-069 Set Parameter Value (SPV) RPCs are to be issued to the controller 104 in order to configure the controller 104 so that the configuration parameters specified in the series of edit-config NETCONF RPCs 552 and 564 have the values specified in those edit-config NETCONF RPCs 552 and 564.

As shown in FIG. 5C, the TR-069-to-NETCONF mapper module 158 asynchronously instructs 586 the ACS 144 to initiate a TR-069 protocol session 590 with the controller 104 for the received series of edit-config NETCONF RPCs 552 and 564. The ACS 144 immediately responds 588 with an operation identifier associated with the commit NETCONF RPC 578 and proceeds with issuing the TR-069 SPV remote procedure calls 592 to the controller 104 as a part of the TR-069 protocol session 590 initiated with the controller 104 for that series of edit-config NETCONF RPCs 552 and 564. (The TR-069 protocol session 590 is initiated after the controller 104 has successfully authenticated the ACS 144 at the HTTP/HTTPS level using the preshared keys included in the authentication information 146 stored in the data persistence database 142 for that controller 104.) When the TR-069 protocol session 590 with the controller 104 for that series of edit-config NETCONF RPCs 552 and 564 is complete, the ACS 144 provides a response 594 to the TR-069-to-NETCONF mapper module 158 indicating that the configuration of the controller 104 has been edited. The response 594 includes the operation identifier associated with the commit NETCONF RPCs 578 so that the TR-069-to-NETCONF mapper module 158 can properly associate the response 594 with the corresponding NETCONF RPC 578.

As shown in FIG. 5C, the TR-069-to-NETCONF mapper module 158 uses the mapping information 160 to assemble an appropriate response 596 to the received commit NETCONF RPC 556 by inserting any needed data from the response 594 into the tags or other parts of the response 596. The TR-069-to-NETCONF mapper module 158 then forwards the response 596 to the NETCONF server 150, which sends a NETCONF response 598 based thereon to the SDN-R 122. Also, the NETCONF server 150 also has the edited NETCONF candidate datastore stored in the data persistence database 142 become the current NETCONF running datastore for the specified controller 104.

In the example described in connection with FIGS. 5B-5C, the NETCONF server 150 maintains a NETCONF running datastore for each controller 104 and creates and edits a NETCONF candidate datastore for each controller 104 as needed. However, it is to be understood that this is optional; the NETCONF server 150 need not use such NETCONF datastores.

The processing associated with methods 200 and 400 (and the adapter entity 140 performing them) enables RAN equipment that does not natively support the NETCONF protocol to be managed by (and communicate with) a NETCONF client (for example, a NETCONF client of a SDN-R). As a result of doing this, a wireless operator that employs an ONAP MANO environment in order to manage the equipment in its network can also use that ONAP MANO environment in order to manage equipment that does not natively support the NETCONF protocol.

Other embodiments can be implemented in other ways.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

Example Embodiments

Example 1 includes an adapter entity configured to manage managed equipment included in a radio access network (RAN) comprising a plurality of nodes, at least some of which are communicatively coupled to each other via a fronthaul network, wherein the RAN is configured to wirelessly communicate with user equipment (UE), the adapter entity comprising: a Technical Report 069 (TR-069) protocol automatic configuration server (ACS) module configured to communicate with at least one node of the RAN using the TR-069 protocol; a Network Configuration Protocol (NETCONF) server configured to communicate with a management entity using NETCONF; and A TR-069-to-NETCONF mapper module, communicatively coupled to the TR-069 protocol ACS module and the NETCONF server, configured to dynamically map NETCONF requests and responses to and from TR-069 Protocol requests and responses, wherein the NETCONF requests and responses are related to the managed equipment and are communicated between the NETCONF server and the management entity, and wherein the TR-069 Protocol requests and responses are related to the managed equipment and are communicated between the TR-069 protocol ACS module and the managed equipment.

Example 2 includes the adapter entity of Example 1, wherein the management entity comprises an Open Network Automation Platform (ONAP) Software Defined Network Radio instance (SDN-R) of an ONAP management and orchestration (MANO) environment.

Example 3 includes the adapter entity of Example 2, wherein the ONAP MANO environment is configured to be deployed in an environment that uses a Kubernetes cluster; and wherein the adapter entity is implemented as a Kubernetes pod or container for deployment in the Kubernetes cluster.

Example 4 includes the adapter entity of any of Examples 1-3, wherein the managed equipment comprises a baseband unit of a radio access network.

Example 5 includes the adapter entity of any of Examples 1-4, wherein the managed equipment comprises multiple nodes of the RAN, wherein the ACS modules is configured to communicate with said multiple nodes of the RAN using the TR-069 protocol.

Example 6 includes the adapter entity of any of Examples 1-5, where the adapter entity is configured to: receive a TR-069 INFORM remote procedure call (RPC) sent from the managed equipment that specifies a particular event associated with the managed equipment has occurred; determine which, if any, TR-069 RPCs need to be issued to the managed equipment in response to the received TR-069 INFORM RPC; determine which, if any, messages need to be sent to one or more entities in the ONAP MANO environment in response to the received TR-069 INFORM RPC; issue to the managed equipment any TR-069 RPCs that need to be issued in response to the received TR-069 INFORM RPC; receive respective responses to the TR-069 RPCs; and send any necessary messages to be sent to one or more entities in the ONAP MANO environment response to the received TR-069 INFORM RPC.

Example 7 includes the adapter entity of Example 6, wherein the TR-069 INFORM RPC specifies that one of the following events has occurred at the managed equipment: a BOOTSTRAP event, a BOOT event, an ALARM VALUE CHANGE event, a PERIODIC event, a CONNECTION REQUEST event, a TRANSFER COMPLETE event, and an AUTONOMOUS TRANSFER COMPLETE event.

Example 8 includes the adapter entity of any of Examples 6-7, wherein the TR-069 INFORM RPC includes a Device Identifier (DeviceID) tag.

Example 9 includes the adapter entity of Example 8, wherein the DeviceID tag comprises a serial number assigned to the managed equipment.

Example 10 includes the adapter entity of any of Examples 6-9, wherein the TR-069 protocol ACS module is configured to receive the TR-069 INFORM RPC sent from the managed equipment.

Example 11 includes the adapter entity of any of Examples 6-10, wherein the TR-069-to-NETCONF mapper module is configured to determine the TR-069 RPCs, if any, that need to be issued to the managed equipment in response to the received TR-069 INFORM RPC and to cause the TR-069 protocol ACS module to issue to the managed equipment any TR-069 RPCs that need to be issued in response to the received TR-069 INFORM RPC.

Example 12 includes the adapter entity of any of Examples 6-11, wherein the TR-069 protocol ACS module is configured to receive the respective responses to the TR-069 RPCs.

Example 13 includes the adapter entity of any of Examples 1-12, wherein the adapter entity further comprises a VNF Event Streaming (VES) Notifier module; wherein the TR-069-to-NETCONF mapper module is configured to push, to the VES Notifier, data from the received TR-069 INFORM RPC and/or from one or more of the responses to any of the TR-069 RPCs issued to the managed equipment; and wherein the VES Notifier is configured to validate, filter, and package the pushed data and communicate the packaged data to a VES Collector function included in the ONAP MANO environment.

Example 14 includes the adapter entity of any of Examples 1-13, where the adapter entity is configured to: receive one more NETCONF remote procedure calls (RPCs) sent from the management entity, the received NETCONF RPCs specifying one or more NETCONF operations to performed for the managed equipment; determine one or more TR-069 RPCs to issue to the managed equipment in order to carry out the one or more NETCONF operations specified in the one or more received NETCONF RPCs; issue the determined one or more TR-069 RPCs to the managed equipment in order to carry out the one or more NETCONF operations specified in the one or more received NETCONF RPCs; receive respective responses to the TR-069 RPCs; assemble a response to the one or more received NETCONF RPCs using the responses to the TR-069 RPCs; and sending the response to the received NETCONF RPC to the management entity.

Example 15 includes the adapter entity of Example 14, wherein the one or more NETCONF operations specified in the one or more received NETCONF RPCs comprise one or more of the following: a NETCONF "get" operation; a NETCONF "get-config" operation; a series of NETCONF "edit-config" operations followed by a corresponding NETCONF "commit" operation; a NETCONF "copy-config" operation; a NETCONF "delete-config" operation; a NETCONF "lock" operation; a NETCONF "unlock" operation; a NETCONF "close-session" operation; and a NETCONF "kill-sessions" operation.

Example 16 includes the adapter entity of any of Examples 14-15, wherein the NETCONF server is configured to receive the one or more received NETCONF RPCs.

Example 17 includes the adapter entity of any of Examples 14-16, wherein the TR-069-to-NETCONF mapper module is configured to determine the one or more TR-069 RPCs to issue to the managed equipment in order to carry out the one or more NETCONF operations specified in the one or more received NETCONF RPCs and to cause the TR-069 protocol ACS module to issue to the managed equipment the one or more TR-069 RPCs to issue to the managed equipment in order to carry out the one or more NETCONF operations specified in the one or more received NETCONF RPCs.

Example 18 includes the adapter entity of any of Examples 14-17, wherein the TR-069 protocol ACS module is configured to receive the respective responses to the TR-069 RPCs.

Example 19 includes the adapter entity of any of Examples 14-18, wherein the TR-069-to-NETCONF mapper module is configured to assemble a response to the one or more received NETCONF RPCs using the responses to the TR-069 RPCs and send the response to the received NETCONF RPC to the management entity via the NETCONF server.

Example 20 includes the adapter entity of any of Examples 1-19, further comprising a data persistence database.

Example 21 includes the adapter entity of any of Examples 1-20, wherein the adapter entity comprises circuitry configured to implement the TR-069 protocol ACS module, the NETCONF server, and the TR-069-to-NETCONF mapper module.

Example 22 includes the adapter entity of any of Examples 1-21, wherein one or more of the TR-069 protocol ACS module, the NETCONF server, and the TR-069-to-NETCONF mapper module are implemented as software executing on one or more computers.

Example 23 includes a method of managing managed equipment used to implement a radio access network (RAN) that is configured to wirelessly communicate with user equipment (UE), the method comprising: receiving, at an adapter entity, a TR-069 INFORM remote procedure call (RPC) sent from the managed equipment that specifies a particular event associated with the managed equipment has occurred; determining which, if any, TR-069 RPCs need to be issued to the managed equipment in response to the received TR-069 INFORM RPC; determining which, if any, messages need to be sent to one or more management entities in response to the received TR-069 INFORM RPC; issuing to the managed equipment any TR-069 RPCs that need to be issued in response to the received TR-069 INFORM RPC; receiving respective responses to the TR-069 RPCs; and sending any necessary messages to be sent to one or more management entities in response to the received TR-069 INFORM RPC.

Example 24 includes the method of Example 23, wherein the one or more management entities comprise one or more entities in an Open Network Automation Platform (ONAP) management and orchestration (MANO) environment.

Example 25 includes the method of any of Examples 23-24, wherein the managed equipment comprises a baseband unit of a radio access network.

Example 26 includes the method of any of Examples 23-25, wherein the managed equipment comprises multiple nodes of the RAN, wherein the ACS modules is configured to communicate with said multiple nodes of the RAN using the TR-069 protocol.

Example 27 includes the method of any of Examples 23-26, wherein the TR-069 INFORM RPC specifies that one of the following events has occurred at the managed equipment: a BOOTSTRAP event, a BOOT event, an ALARM VALUE CHANGE event, a PERIODIC event, a CONNECTION REQUEST event, a TRANSFER COMPLETE event, and an AUTONOMOUS TRANSFER COMPLETE event.

Example 28 includes the method of any of Examples 23-27, wherein the TR-069 INFORM RPC includes a Device Identifier (DeviceID) tag.

Example 29 includes the method of Example 28, wherein the DeviceID tag comprises a serial number assigned to the managed equipment.

Example 30 includes a method of managing managed equipment used to implement a radio access network (RAN) that is configured to wirelessly communicate with user equipment (UE), the method comprising: receiving, at an adapter entity, one more a Network Configuration Protocol (NETCONF) remote procedure calls (RPCs) sent from a management entity using NETCONF, the received NETCONF RPCs specifying one or more NETCONF operations to performed for the managed equipment; determining, by the adapter entity, one or more TR-069 RPCs to issue to the managed equipment in order to carry out the one or more NETCONF operations specified in the one or more received NETCONF RPCs; issuing the determined one or more TR-069 RPCs from the adapter entity to the managed equipment in order to carry out the one or more NETCONF operations specified in the one or more received NETCONF RPCs; receiving, at the adapter entity, respective responses to the TR-069 RPCs; assembling, by the adapter entity, a response to the one or more received NETCONF RPCs using the responses to the TR-069 RPCs; and sending the response to the received NETCONF RPCs from the adapter entity to the management entity.

Example 31 includes the method of Example 30, wherein the management entity comprises an Open Network Automation Platform (ONAP) Software Defined Network Radio instance (SDN-R) of an ONAP management and orchestration (MANO) environment.

Example 32 includes the method of any of Examples 30-31, wherein the managed equipment comprises a baseband unit of a radio access network.

Example 33 includes the method of any of Examples 30-32, wherein the one or more NETCONF operations specified in the one or more received NETCONF RPCs comprise one or more of the following: a NETCONF "get" operation; a NETCONF "get-config" operation; a series of NETCONF "edit-config" operations followed by a corresponding NETCONF "commit" operation; a NETCONF "copy-config" operation; a NETCONF "delete-config" operation; a NETCONF "lock" operation; a NETCONF "unlock" operation; a NETCONF "close-session" operation; and a NETCONF "kill-sessions" operation.

What is claimed is:

1. An adapter entity configured to manage managed equipment included in a radio access network (RAN) comprising a plurality of nodes, at least some of which are communicatively coupled to each other via a fronthaul network, wherein the RAN is configured to wirelessly communicate with user equipment (UE), the adapter entity comprising:
  a Technical Report 069 (TR-069) protocol automatic configuration server (ACS) module configured to communicate with at least one node of the RAN using a TR-069 protocol;
  a Network Configuration Protocol (NETCONF) server configured to communicate with a management entity using NETCONF; and
  A TR-069-to-NETCONF mapper module, communicatively coupled to the TR-069 protocol ACS module and the NETCONF server, configured to dynamically map NETCONF requests and responses to and from TR-069 Protocol requests and responses, wherein the NETCONF requests and responses are related to the managed equipment and are communicated between the NETCONF server and the management entity, and wherein the TR-069 Protocol requests and responses are related to the managed equipment and are communicated between the TR-069 protocol ACS module and the managed equipment.

2. The adapter entity of claim 1, wherein the management entity comprises an Open Network Automation Platform (ONAP) Software Defined Network Radio instance (SDN-R) of an ONAP management and orchestration (MANO) environment.

3. The adapter entity of claim 2, wherein the ONAP MANO environment is configured to be deployed in an environment that uses a Kubernetes cluster; and
  wherein the adapter entity is implemented as a Kubernetes pod or container for deployment in the Kubernetes cluster.

4. The adapter entity of claim 1, wherein the managed equipment comprises a baseband unit of a radio access network.

5. The adapter entity of claim 1, wherein the managed equipment comprises multiple nodes of the RAN, wherein the ACS modules are configured to communicate with said multiple nodes of the RAN using the TR-069 protocol.

6. The adapter entity of claim 1, where the adapter entity is configured to:
  receive a TR-069 INFORM remote procedure call (RPC) sent from the managed equipment that specifies a particular event associated with the managed equipment has occurred;
  determine which, if any, TR-069 RPCs need to be issued to the managed equipment in response to the received TR-069 INFORM RPC;
  determine which, if any, messages need to be sent to one or more entities in the ONAP MANO environment in response to the received TR-069 INFORM RPC;
  issue to the managed equipment any TR-069 RPCs that need to be issued in response to the received TR-069 INFORM RPC;
  receive respective responses to the TR-069 RPCs; and
  send any necessary messages to be sent to one or more entities in the ONAP MANO environment response to the received TR-069 INFORM RPC.

7. The adapter entity of claim 6, wherein the TR-069 INFORM RPC specifies that one of the following events has occurred at the managed equipment: a BOOTSTRAP event, a BOOT event, an ALARM VALUE CHANGE event, a PERIODIC event, a CONNECTION REQUEST event, a TRANSFER COMPLETE event, and an AUTONOMOUS TRANSFER COMPLETE event.

8. The adapter entity of claim 6, wherein the TR-069 INFORM RPC includes a Device Identifier (DeviceID) tag.

9. The adapter entity of claim 8, wherein the DeviceID tag comprises a serial number assigned to the managed equipment.

10. The adapter entity of claim 6, wherein the TR-069 protocol ACS module is configured to receive the TR-069 INFORM RPC sent from the managed equipment.

11. The adapter entity of claim 6, wherein the TR-069-to-NETCONF mapper module is configured to determine the TR-069 RPCs, if any, that need to be issued to the managed equipment in response to the received TR-069 INFORM RPC and to cause the TR-069 protocol ACS module to issue to the managed equipment any TR-069 RPCs that need to be issued in response to the received TR-069 INFORM RPC.

12. The adapter entity of claim 6, wherein the TR-069 protocol ACS module is configured to receive the respective responses to the TR-069 RPCs.

13. The adapter entity of claim 1, wherein the adapter entity further comprises a VNF Event Streaming (VES) Notifier module;
  wherein the TR-069-to-NETCONF mapper module is configured to push, to the VES Notifier, data from the received TR-069 INFORM RPC and/or from one or more of the responses to any of the TR-069 RPCs issued to the managed equipment; and wherein the VES Notifier is configured to validate, filter, and package the pushed data and communicate the packaged data to a VES Collector function included in the ONAP MANO environment.

14. The adapter entity of claim 1, where the adapter entity is configured to:
receive one more NETCONF remote procedure calls (RPCs) sent from the management entity, the received NETCONF RPCs specifying one or more NETCONF operations to performed for the managed equipment;
determine one or more TR-069 RPCs to issue to the managed equipment in order to carry out the one or more NETCONF operations specified in the one or more received NETCONF RPCs;
issue the determined one or more TR-069 RPCs to the managed equipment in order to carry out the one or more NETCONF operations specified in the one or more received NETCONF RPCs;
receive respective responses to the TR-069 RPCs;
assemble a response to the one or more received NETCONF RPCs using the responses to the TR-069 RPCs; and
sending the response to the received NETCONF RPC to the management entity.

15. The adapter entity of claim 14, wherein the one or more NETCONF operations specified in the one or more received NETCONF RPCs comprise one or more of the following:
a NETCONF "get" operation;
a NETCONF "get-config" operation;
a series of NETCONF "edit-config" operations followed by a corresponding NETCONF "commit" operation;
a NETCONF "copy-config" operation;
a NETCONF "delete-config" operation;
a NETCONF "lock" operation;
a NETCONF "unlock" operation;
a NETCONF "close-session" operation; and
a NETCONF "kill-sessions" operation.

16. The adapter entity of claim 14, wherein the NETCONF server is configured to receive the one or more received NETCONF RPCs.

17. The adapter entity of claim 14, wherein the TR-069-to-NETCONF mapper module is configured to determine the one or more TR-069 RPCs to issue to the managed equipment in order to carry out the one or more NETCONF operations specified in the one or more received NETCONF RPCs and to cause the TR-069 protocol ACS module to issue to the managed equipment the one or more TR-069 RPCs to issue to the managed equipment in order to carry out the one or more NETCONF operations specified in the one or more received NETCONF RPCs.

18. The adapter entity of claim 14, wherein the TR-069 protocol ACS module is configured to receive the respective responses to the TR-069 RPCs.

19. The adapter entity of claim 14, wherein the TR-069-to-NETCONF mapper module is configured to assemble a response to the one or more received NETCONF RPCs using the responses to the TR-069 RPCs and send the response to the received NETCONF RPC to the management entity via the NETCONF server.

20. The adapter entity of claim 1, further comprising a data persistence database.

21. The adapter entity of claim 1, wherein the adapter entity comprises circuitry configured to implement the TR-069 protocol ACS module, the NETCONF server, and the TR-069-to-NETCONF mapper module.

22. The adapter entity of claim 1, wherein one or more of the TR-069 protocol ACS module, the NETCONF server, and the TR-069-to-NETCONF mapper module are implemented as software executing on one or more computers.

23. A method of managing managed equipment used to implement a radio access network (RAN) that is configured to wirelessly communicate with user equipment (UE), the method comprising:
receiving, at an adapter entity, a Technical Report 069 (TR-0691 INFORM remote procedure call (RPC) sent from the managed equipment that specifies a particular event associated with the managed equipment has occurred;
determining which, one or more TR-069 RPCs that need to be issued to the managed equipment in response to the received TR-069 INFORM RPC;
determining which, one or more messages that need to be sent to one or more management entities in response to the received TR-069 INFORM RPC;
issuing to the managed equipment the determined one or more TR-069 RPCs that need to be issued in response to the received TR-069 INFORM RPC;
receiving respective responses to the determined one or more TR-069 RPCs; and
sending the determined one or more messages that need to be sent to one or more management entities in response to the received TR-069 INFORM RPC.

24. The method of claim 23, wherein the one or more management entities comprise one or more entities in an Open Network Automation Platform (ONAP) management and orchestration (MANO) environment.

25. The method of claim 23, wherein the managed equipment comprises a baseband unit of a radio access network.

26. The method of claim 23, wherein the managed equipment comprises multiple nodes of the RAN, wherein the ACS modules are configured to communicate with said multiple nodes of the RAN using a TR-069 protocol.

27. The method of claim 23, wherein the TR-069 INFORM RPC specifies that one of the following events has occurred at the managed equipment: a BOOTSTRAP event, a BOOT event, an ALARM VALUE CHANGE event, a PERIODIC event, a CONNECTION REQUEST event, a TRANSFER COMPLETE event, and an AUTONOMOUS TRANSFER COMPLETE event.

28. The method of claim 23, wherein the TR-069 INFORM RPC includes a Device Identifier (DeviceID) tag.

29. The method of claim 28, wherein the DeviceID tag comprises a serial number assigned to the managed equipment.

30. A method of managing managed equipment used to implement a radio access network (RAN) that is configured to wirelessly communicate with user equipment (UE), the method comprising:
receiving, at an adapter entity, one more a Network Configuration Protocol (NETCONF) remote procedure calls (RPCs) sent from a management entity using NETCONF, the received NETCONF RPCs specifying one or more NETCONF operations to performed for the managed equipment;
determining, by the adapter entity, one or more Technical Report 069 (TR-069) RPCs to issue to the managed equipment in order to carry out the one or more NETCONF operations specified in the one or more received NETCONF RPCs;
issuing the determined one or more TR-069 RPCs from the adapter entity to the managed equipment in order to carry out the one or more NETCONF operations specified in the one or more received NETCONF RPCs;

receiving, at the adapter entity, respective responses to the TR-069 RPCs;

assembling, by the adapter entity, a response to the one or more received NETCONF RPCs using the responses to the TR-069 RPCs; and sending the response to the received NETCONF RPCs from the adapter entity to the management entity.

31. The method of claim 30, wherein the management entity comprises an Open Network Automation Platform (ONAP) Software Defined Network Radio instance (SDN-R) of an ONAP management and orchestration (MANO) environment.

32. The method of claim 30, wherein the managed equipment comprises a baseband unit of a radio access network.

33. The method of claim 30, wherein the one or more NETCONF operations specified in the one or more received NETCONF RPCs comprise one or more of the following:

a NETCONF "get" operation;
a NETCONF "get-config" operation;
a series of NETCONF "edit-config" operations followed by a corresponding NETCONF "commit" operation;
a NETCONF "copy-config" operation;
a NETCONF "delete-config" operation;
a NETCONF "lock" operation;
a NETCONF "unlock" operation;
a NETCONF "close-session" operation; and
a NETCONF "kill-sessions" operation.

* * * * *

UNITED STATES PATENT AND TRADEMARK OFFICE
CERTIFICATE OF CORRECTION

PATENT NO. : 11,968,282 B2
APPLICATION NO. : 17/207037
DATED : April 23, 2024
INVENTOR(S) : Sambandan et al.

Page 1 of 1

It is certified that error appears in the above-identified patent and that said Letters Patent is hereby corrected as shown below:

In the Claims

At Column 24, Line 10, please replace "(TR-0691 INFORM" with --(TR-069) INFORM--

At Column 24, Line 14, please replace "determining which, one or more" with --determining one or more--

At Column 24, Line 17, please replace "determining which, one or more" with --determining one or more--

At Column 24, Line 59, please replace "operations to performed for" with --operations to be performed--

Signed and Sealed this
Twenty-ninth Day of October, 2024

Katherine Kelly Vidal
*Director of the United States Patent and Trademark Office*